(12) United States Patent
Hirai

(10) Patent No.: US 6,850,619 B1
(45) Date of Patent: Feb. 1, 2005

(54) COPYRIGHT PROTECTION METHOD, INFORMATION SIGNAL PROCESSING SYSTEM, INFORMATION SIGNAL OUTPUT APPARATUS, INFORMATION SIGNAL PROCESSING APPARATUS, INFORMATION SIGNAL OUTPUT METHOD, INFORMATION SIGNAL PROCESSING METHOD, AND INFORMATION SIGNAL RECORDING MEDIUM

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 801 days.

(21) Appl. No.: 09/616,832

(22) Filed: Jul. 14, 2000

(30) Foreign Application Priority Data

Jul. 16, 1999 (JP) .......................................... P11-202927

(51) Int. Cl.[7] .......................... H04N 7/167; H04L 9/00; G06K 9/00
(52) U.S. Cl. ....................... 380/203; 380/201; 713/176; 382/100
(58) Field of Search ................................ 713/176–179, 713/200–201; 705/57–59; 380/200–204, 100; 382/232, 250

(56) References Cited

U.S. PATENT DOCUMENTS 5,315,448 A * 5/1994 Ryan ........................... 360/60
6,332,194 B1 * 12/2001 Bloom et al. ................ 713/176
6,442,285 B2 * 8/2002 Rhoads et al. ............... 382/100
6,490,355 B1 * 12/2002 Epstein ......................... 380/203
6,633,723 B1 * 10/2003 Kuroda et al. ................. 386/94

FOREIGN PATENT DOCUMENTS

JP        11-176089     *  7/1999    ........... G11B/20/10

OTHER PUBLICATIONS

Ferrill, E. et al, A Survey of Digital Watermarking, Feb. 1999.*
Swanson, M. et al, Multimedia Data–Embedding and Watermarking Technologies, Jun. 1998, IEEE.*
Miller, M. et al, Watermarking in the Real World: An Application to DVD, 1998, IEEE.*

* cited by examiner

*Primary Examiner*—Gilberto Barron
*Assistant Examiner*—Minh Dinh
(74) *Attorney, Agent, or Firm*—Jay H. Maioli

(57) ABSTRACT

Additional information for copyright protection is added to a video signal (first information signal) and an audio signal (second information signal), which are associated with each other and are independently usable, in a video watermark information superimposition unit and an audio watermark information superimposition unit, respectively. The video signal and the audio signal having the additional information added are then output. In a receiving apparatus for receiving the video signal and the audio signal, copyright protection is performed on at least one of the video signal and the audio signal based on both the additional information added to the video signal and the additional information added to the audio signal.

18 Claims, 10 Drawing Sheets

FIG. 12

| CASE | VIDEO DIGITAL WATERMARK | AUDIO DIGITAL WATERMARK | DETERMINATION | STATE |
|---|---|---|---|---|
| 1 | NEVER COPY | NEVER COPY | NEVER COPY | CORRECT |
| 2 | NEVER COPY | COPY ONCE | NEVER COPY | ABNORMAL |
| 3 | NEVER COPY | NO MORE COPIES | NEVER COPY | ABNORMAL |
| 4 | NEVER COPY | COPY FREE | NEVER COPY | ABNORMAL |
| 5 | NEVER COPY | NOT DETECTED | NEVER COPY *1 | |
| 6 | NO MORE COPIES | NEVER COPY | NEVER COPY | ABNORMAL |
| 7 | NO MORE COPIES | NO MORE COPIES | NO MORE COPIES | NORMAL |
| 8 | NO MORE COPIES | COPY ONCE | COPY ONCE *2 | SPECIFIC |
| 9 | NO MORE COPIES | COPY FREE | NO MORE COPIES | ABNORMAL |
| 10 | NO MORE COPIES | NOT DETECTED | NO MORE COPIES *1 | |
| 11 | COPY FREE | NEVER COPY | NEVER COPY | ABNORMAL |
| 12 | COPY FREE | NO MORE COPIES | NO MORE COPIES | ABNORMAL |
| 13 | COPY FREE | COPY ONCE | COPY ONCE | ABNORMAL |
| 14 | COPY FREE | COPY FREE | COPY FREE | CORRECT |
| 15 | COPY FREE | NOT DETECTED | COPY FREE | RECORDED ON ONLY VIDEO |
| 16 | NOT DETECTED | NEVER COPY | NEVER COPY | RECORDED ON ONLY AUDIO |
| 17 | NOT DETECTED | NO MORE COPIES | NO MORE COPIES | RECORDED ON ONLY AUDIO |
| 18 | NOT DETECTED | COPY ONCE | COPY ONCE | RECORDED ON ONLY AUDIO |
| 19 | NOT DETECTED | COPY FREE | COPY FREE | RECORDED ON ONLY AUDIO |
| 20 | NOT DETECTED | NOT DETECTED | COPY FREE | NORMAL |

COPYRIGHT PROTECTION METHOD, INFORMATION SIGNAL PROCESSING SYSTEM, INFORMATION SIGNAL OUTPUT APPARATUS, INFORMATION SIGNAL PROCESSING APPARATUS, INFORMATION SIGNAL OUTPUT METHOD, INFORMATION SIGNAL PROCESSING METHOD, AND INFORMATION SIGNAL RECORDING MEDIUM

BACKGROUND OF THE INVENTION

1. Field of the Invention

The present invention relates to a copyright protection method and an information signal processing system for information signals, such as video signals and audio signals, transmitted via, for example, broadcast media, communication media, or recording media. The invention also relates to an information signal output apparatus, an information signal processing apparatus, an information signal output method, an information signal processing method, and an information signal recording medium used in the above-described copyright protection method and the information signal processing system.

2. Description of the Related Art

Various types of digital content are being widely provided via digital broadcasts, the Internet, or recording media, such as small magneto-optical disks, which are referred to as digital video discs (DVDs) or mini disks (MDs) (trade name)". Copyright infringement incurred by illegal copying of video signals (image information) and audio signals (audio information), such as music, to be provided as digital content is becoming a problem.

In order to address this problem, information for protecting the copyright may be added to digital content, and by using this additional information, illegal copying may be prevented. To prevent illegal copying, the following cases are considered according to the information sources, such as video signals and audio signals, in which copying may be absolutely prohibited, or copying may be allowed for one generation, but further copying from a copy is prohibited (generation-restricted copying control method).

The first case is applied to original software created and sold by content makers, such as DVD-ROMs. The second case, i.e., the generation-restricted copying control method, is applied to, for example, information to be broadcast in broadcast media and information to be transmitted and received via communication media.

In the generation-restricted copying control method, a technique for effectively controlling copy generations is desirably employed. As copying control methods in which copy generations can be managed, the Copy Generation Management System (CGMS) method and a method using digital watermark processing are proposed for video signals, and the Serial Copy Management System (SCMS) method is proposed for audio signals.

According to the digital watermark processing, information is embedded as noise in parts which are not appreciably perceptible, namely, a redundant portion for music or pictures, of a video signal or an audio signal. The additional information embedded into a video signal or an audio signal according to the digital watermark processing is not easily removed. Moreover, even after performing filtering processing and data compression processing on the video signal or the audio signal, the additional digital-watermark information embedded in the video signal or the audio signal can be detected from image data or music data, respectively.

According to the copying control method using this digital watermark processing, additional information may represent the following four states according to the type of additional information to be embedded, and thus represent the copy generation and the copy-restricted state of the video signal or the audio signal on which the digital watermark information is superimposed.

1. "Copying is allowed (Copy Free)"

2. "copying is allowed for only one generation (Copy Once)"

3. "Copying is prohibited for further generations (No More Copies)"

4. "Copying is absolutely prohibited (Never Copy)"

State 1. "Copying is allowed (Copy Free)", represents that free copying of video signals and audio signals is allowed. State 2, "Copying is allowed for only one generation (Copy Once)", indicates that first-generation copying of video signals and audio signals is allowed. State 3, "Copying is prohibited for further generations (No More Copies)", represents the state of a video signal or an audio signal which was copied from State 2 of the video signal or the audio signal, and indicates that copying is no longer allowed. State 4, "Copying is absolutely prohibited (Never Copy)", represents that copying is totally prohibited from the original state.

If the digital watermark information superimposed on a video signal or an audio signal corresponds to "copying is allowed for only one generation (Copy Once)", a digital-watermark-compatible recording apparatus (that is, an apparatus compatible with copying restriction) determines that the video signal or the audio signal can be copied, and performs a recording operation. However, digital watermark information overwritten by the state "copying is prohibited for further generations (No More Copies)" is superimposed on the recorded image data or the recorded audio data. If the digital watermark information superimposed on the video signal or the audio signal to be recorded corresponds to the state "copying is absolutely prohibited (Never Copy)", the digital-watermark-compatible recording apparatus determines that copying of the video signal or the audio signal is absolutely prohibited, and thus does not perform a recording operation.

In the CGMS method, for an analog image signal, two-bit copy-controlling additional information is superimposed on a specific horizontal interval within a vertical blanking period, and for a digital image signal, two-bit copy-controlling additional information is added to digital image data. Then, the resulting analog image data and the resulting digital image data are transmitted.

The two-bit information in this CGMS method (hereinafter referred to as the "CGMS information") contains:

[00] . . . copying allowed;

[10] . . . copying allowed for only one generation; and

[11] . . . copying prohibited (copying is absolutely prohibited).

In the CGMS method, the State "copying is prohibited for further generations" described above does not exist.

When the CGMS information added to a video signal indicates [10], a CGMS-compatible recording apparatus determines that the video signal can be copied, and conducts a recording operation. However, the CGMS information overwritten by [11] is added to the recorded video signal.

When the CGMS information added to the video signal to be recorded indicates [11], the CGMS-compatible recording apparatus determines that copying of the video signal is prohibited, and thus does not perform a recording operation.

According to the SCMS method, by using a copy prohibit/allow flag and a category code representing the type of digital audio system, such as a compact disc (CD) or a digital audio tape (DAT), which are transmitted together with a digital audio signal, serial-copying control is performed so that digital copying can be made only once.

That is, in the SCMS method, according to the SCMS information consisting of the copy prohibit/allow flag and the category code to be transmitted together with the digital audio signal, generation-restricted copying control can be performed on the digital audio signal in such a manner that the first-generation digital audio signal can be copied, but the copied digital audio signal cannot be copied any more.

In the above-described CGMS method, the CGMS information is added to a portion different from the information forming a picture (image). Similarly, in the SCMS method, the SCMS information is added to a portion different from the information forming sound, such as music. Accordingly, when using the above-described methods, only a minimal loss is incurred in the picture or the sound, but on the other hand, the picture or the sound is vulnerable to attacks, such as the removal and tampering of the CGMS information or the SCMS information added to a portion different from the information forming the picture or the sound.

In contrast, digital watermark information formed by the digital watermark processing is superimposed in the same time domain and the same frequency band as those of the main information, such as a video signal or an audio signal. The digital watermark information is thus resistant to attacks, such as the removal and tampering of the information. However, at an excessively high superimposition level of the digital watermark information, the image or music (sound) becomes deteriorated. Conversely, at an excessively low superimposition level, it is difficult to detect the digital watermark information, thereby failing to perform speedy and appropriate copying control. If the transfer rate (transmission rate) of the video signal or the audio signal is high, the digital watermark information may not be easily detected.

As discussed above, in superimposing the digital watermark information on a video signal or an audio signal, the problem of tradeoffs is encountered. More specifically, factors, such as the degradation of a picture or music caused by the superimposition of the digital watermark, the data transfer rate, and the reliability of the data, are in a tradeoff relationship, and it is thus difficult to satisfy all the factors.

The CGMS method, the SCMS method, and the digital watermark method using digital watermark information are effective as a copying-restricted control method and a generation-restricted copying control method for video signals and audio signals. However, these methods present the above-described problem, and thus, there is still a demand for a copyright protection method with a higher reliability.

SUMMARY OF THE INVENTION

Accordingly, in view of the above background, it is an object of the present invention to provide a copyright protection method and an information signal processing system for providing copyright protection with a higher reliability for information signals, such as video signals and audio signals, and also to provide an information signal output apparatus, an information signal processing apparatus, an information signal output method, an information signal processing method, and an information signal recording medium which are used in the above-described copyright protection method and the information signal processing system.

In order to achieve the above object, according to one aspect of the present invention, there is provided a copyright protection method including the steps of: adding, on a transmitting side, additional information for copyright protection to a first information signal and a second information signal, which are associated with each other and which are independently usable, and outputting the first information signal and the second information signal with the additional information; and controlling, on a receiving side, a copyright protection operation on at least one of the first information signal and the second information signal based on the additional information added to the first information signal and the additional information added to the second information signal.

According to another aspect of the present invention, there is provided a copyright protection method including the steps of: transmitting, on a transmitting side, an information signal having first additional information by using a first channel, and also transmitting second additional information concerning the information signal by using a second channel; and controlling, on a receiving side, a copyright protection operation on the information signal based on the first additional information and the second additional information.

According to still another aspect of the present invention, there is provide an information signal processing system including: an information signal output apparatus for outputting a first information signal and a second information signal, which are associated with each other and which are independently usable; and an information signal, processing apparatus for processing the first information signal and the second information signal output from the information signal output apparatus. The information signal output apparatus includes a first additional-information generator for generating first additional information for copyright protection to be added to the first information signal. A first additional-information addition unit adds the first additional information generated from the first additional-information generator to the first information signal. A second additional-Information generator generates second additional information for copyright protection to be added to the second information signal. A second additional-information addition unit adds the second additional information generated from the second additional-information generator to the second information signal. An information signal output unit outputs the first information signal having the first additional information and the second information signal having the second additional information. The information signal processing apparatus includes a first additional-information extraction unit for extracting the first additional information from the first information signal output from the information signal output apparatus. A second additional-information extraction unit extracts the second additional information from the second information signal output from the information signal output apparatus. A control unit controls a copyright protection operation on at least one of the first information signal and the second information signal based on the first additional information and the second additional information extracted by the first additional-information extraction unit and the second additional-information extraction unit, respectively.

According to a further aspect of the present invention, there is provided an information signal processing system including: an information signal output apparatus for outputting a first information signal and a second information signal, which are associated with each other and an information signal processing apparatus for processing the first information signal and the second information signal output from the information signal output apparatus. The information signal output apparatus includes an additional-information generator for generating first additional information for copyright protection. An additional-information addition unit adds the first additional information generated from the additional-information generator to the first information signal and the second information signal. An information signal output unit outputs the first information signal and the second information signal having the first additional information added by the additional-information addition unit. An additional-information output unit outputs second additional information for copyright protection concerning the first information signal and the second information signal. The information signal processing apparatus includes an information signal input unit for receiving the first information signal and the second information signal output from the information signal output unit of the information signal output apparatus. An additional-information input unit receives the second additional information output from the additional-information output means of the information signal output apparatus. An additional-information extraction unit extracts the first additional information added to the first information signal and the second information signal from the first and second information signal received by the information signal input unit. A control unit controls a copyright protection operation on the first information signal and the second information signal based on the first additional information extracted by the additional-information extraction unit and the second additional information received by the additional-information input unit.

According to a yet further aspect of the present invention, there is provided an information signal output apparatus for outputting a first information signal and a second information signal, which are associated with each other and which are independently usable. The information signal output apparatus includes a first additional-information generator for generating first additional information for copyright protection to be added to the first information signal. A first additional-information addition unit adds the first additional information generated from the first additional-information generator to the first information signal. A second additional-information generator generates second additional information for copyright protection to be added to the second information signal. A second additional-information addition unit adds the second additional information generated from the second additional-information generator to the second information signal. An information signal output unit outputs the first information signal having the first additional information and the second information signal having the second additional information.

According to a further aspect of the present invention, there is provided an information signal output apparatus including an additional-information generator for generating first additional information for copyright protection. An additional-information addition unit adds the first additional information generated from the additional-information generator to an information signal. An information signal output unit outputs the information signal having the first additional information added by the additional-information addition unit. An additional-information output unit outputs second additional information for copyright protection concerning the information signal.

According to a further aspect of the present invention, there is provided an information signal processing apparatus for processing a first information signal and a second information signal, which are associated with each other and which are independently usable, having first additional information and second additional information, respectively, for copyright protection. The information signal processing apparatus includes, a first additional-information extraction unit for extracting the first additional information added to the first information signal. A second additional-information extraction unit extracts the second additional information added to the second information signal. A control unit controls a copyright protection operation on at least one of the first information signal and the second information signal based on the first additional information and the second additional information extracted by the first additional-information extraction unit and the second additional-information extraction unit, respectively.

According to a further aspect of the present invention, there is provided an information signal processing apparatus for transmitting an information signal having first additional information for copyright protection and transmitting second additional information for copyright protection concerning the information signal by using different channels, and for receiving the information signal. The information signal processing apparatus includes an information signal input unit for receiving the information signal. An additional-information input unit receives the second additional information. An additional-information extraction unit extracts the first additional information from the information signal received by the information signal input unit. A control unit performs a copyright protection operation on the information signal based on the first additional information extracted by the additional-information extraction unit and the second additional information received by the additional-information input unit.

According to a further aspect of the present invention, there is provided an information signal recording medium on which a first information signal and a second information signal, which are associated with each other, are recorded. First additional information for copyright protection is added to the first information signal, and second additional information for copyright protection is added to the second information signal. Relating information for relating the first information signal to the second information signal is added to the first information signal and the second information signal.

According to a further aspect of the present invention, there is provided an information signal output method for outputting a first information signal and a second information signal, which are associated with each other and which are independently usable. The information signal output method includes: a first additional-information generating step of generating first additional information for copyright protection to be added to the first information signal; a first additional-information addition step of adding the first additional information generated in the first additional-information generating step to the first information signal; a second additional-information generating step of generating second additional information for copyright protection to be added to the second information signal; a second additional-information addition step of adding the second additional information generated in the second additional-information generating step to the second information signal; and an outputting step of outputting the first information signal having the first additional information and the second information signal having the second additional information.

According to a further aspect of the present invention, there is provided an information signal output method including: an additional-information generating step of generating first additional information for copyright protection; an additional-information addition step of adding the first additional information generated in the additional-information generating step to an information signal; and an outputting step of outputting the information signal having the first additional information added in the additional-information addition step and outputting second additional information for copyright protection concerning the information signal.

According to a further aspect of the present invention, there is provided an information signal processing method for processing a first information signal and a second information signal, which are associated with each other and which are independently usable, having first additional information and second additional information for copyright protection. The information signal processing method includes: a first additional-information extraction step of extracting the first additional information added to the first information signal; a second additional-information extraction step of extracting the second additional information added to the second information signal; and a controlling step of controlling a copyright protection operation on at least one of the first information signal and the second information signal based on the first additional information and the second additional information extracted in the first additional-information extraction step and the second additional-information extraction step, respectively.

According to a further aspect of the present invention, there is provided an information signal receiving method for transmitting an information signal having first additional information for copyright protection and transmitting second additional information for copyright protection concerning the information signal by using different channels, and for processing the information signal. The information signal receiving method includes: an information signal receiving step of receiving the information signal; a second-additional-information receiving step of receiving the second additional information; an extraction step of extracting the first additional information added to the information signal received in the information signal receiving step; and a controlling step of controlling a copyright protection operation on the information signal based on the first additional information extracted in the extraction step and the second additional information received in the second-additional-information receiving step.

BRIEF DESCRIPTION OF THE DRAWINGS

FIG. 12 is a logical table illustrating relationships between copying control information superimposed on a video signal and copying control information superimposed on an audio signal for performing a copying control operation and a playback control operation;

DESCRIPTION OF THE PREFERRED EMBODIMENTS

A description is given below, with reference to the drawings, of an information signal processing system according to an embodiment of the present invention incorporating a copyright protection method according to an embodiment of the present invention. An information signal output apparatus, an information signal processing apparatus, an information signal output method, an information signal processing method, and an information signal recording medium for use in the above-described copyright protection method and the information signal processing system are also discussed below with reference to the accompanying drawings.

In the description, the present invention is described in the following context. A video signal and an audio signal, which are associated with each other and can be independently used, are employed as a first information signal and a second information signal, respectively. Additional information used for copyright protection is superimposed on the video signal and the audio signal as digital watermark information.

[Information signal output apparatus]

Figure 1:
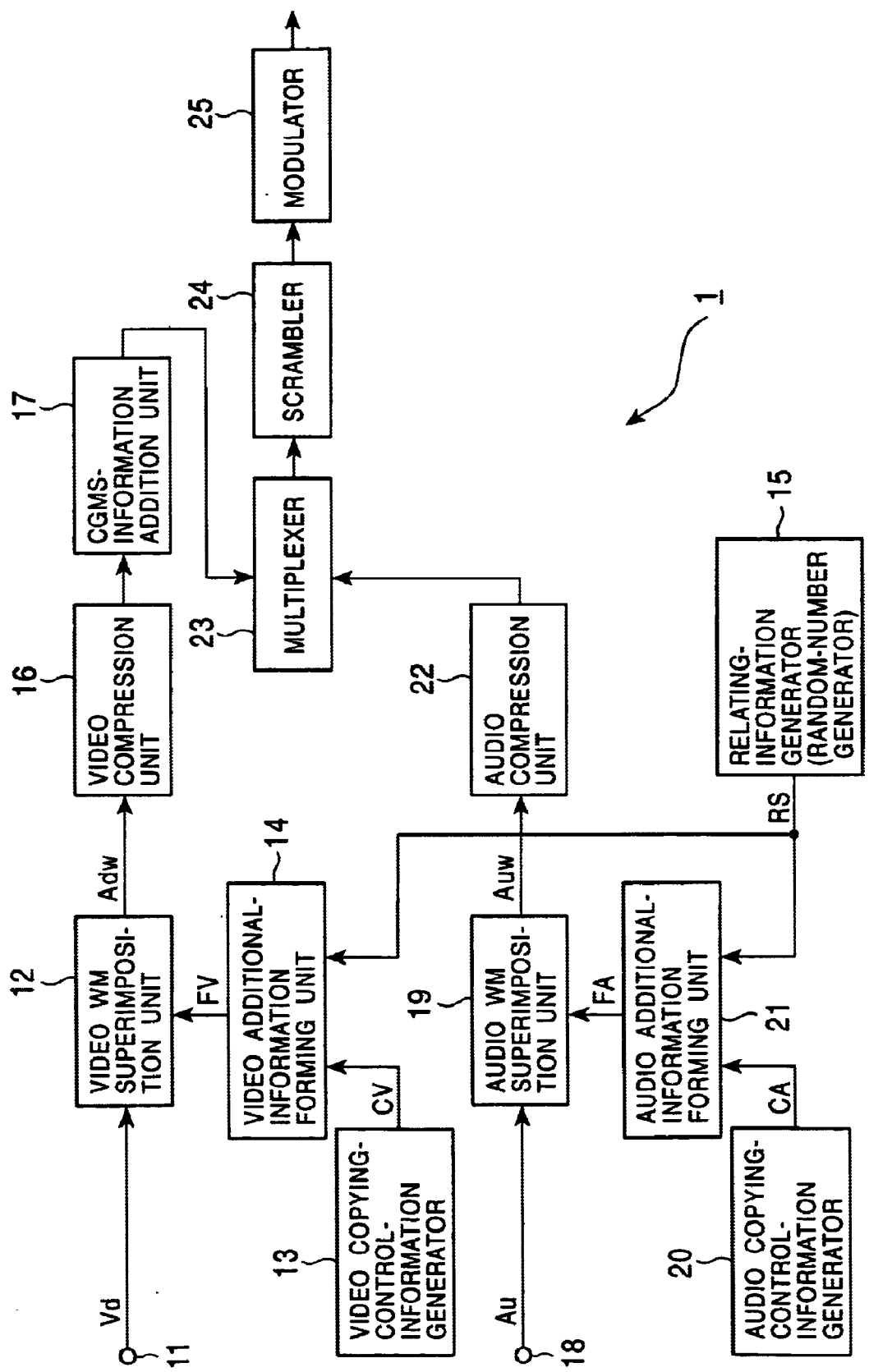
FIG. 1 is a block diagram illustrating an information signal output apparatus according to an embodiment of the present invention.

FIG. 1 is a block diagram illustrating an information signal output apparatus according to an embodiment of the present invention. The information signal output apparatus of this embodiment may be used in, for example, a broadcast station, to generate and output broadcast signals consisting of a video signal and an audio signal. Alternatively, the information signal output apparatus may be used in a content provider as a so-called "authoring tool" for creating recording media, such as DVDs, on which content consisting of a video signal and an audio signal, such as movies, are recorded.

As shown in FIG. 1, an information signal output authoring) apparatus 1 of this embodiment has an input terminal 11 for video signals and an input terminal 18 for audio signals. As additional information for copyright protection, additional information containing copying control information is superimposed on a supplied video signal and a supplied audio signal as digital watermark information, and the resulting signals are then output. A discussion is given of this information signal output apparatus 1 below.

The information signal output apparatus (hereinafter simply referred to as the "Output apparatus") 1 includes, as shown in FIG. 1, the digital-video-signal input terminal 11, and a video digital-watermark-information superimposition unit 12 (hereinafter referred to as the "video WM superimposition unit" 12). WM stands for digital watermark information (digital watermark), and the same applies to the following description in the specification. The output apparatus 1 also includes a video copying-control-information generator 13, a video additional-information forming unit 14, a relating-information generator 15, a video compression unit 16, a CGMS-information addition unit 17, the digital-audio-signal input terminal 18, an audio digital-watermark superimposition unit (hereinafter referred to as the "audio WM superimposition unit") 19, an audio copying-control-information generator 20, an audio additional-information forming unit 21, an audio compression unit 22, a multiplexer 23, a scrambler (encryption unit) 24, and a modulator 25.

A video signal Vd supplied via the input terminal 11 is supplied to the video WM superimposition unit 12. Meanwhile, the video copying-control-information generator 13 generates copying control information CV to be superimposed on the video signal Vd which has been supplied to the output apparatus 1, and supplies it to the video-signal additional-information forming unit 14.

In this embodiment, the video copying-control-information generator 13 is able to generate two-bit copying control information CV corresponding to the following four copying control states. When the control state is 1, "Copying is allowed (Copy Free)", the control information CV indicating "00" is generated. When the control state is 2, "Copying is allowed for only one generation (Copy Once)", the control information CV indicating "10" is generated. When the control state is 3, "Copying is prohibited for further generations (No More Copies)", the control information CV indicating "01" is generated. When the control state is 4, "Copying is absolutely prohibited (Never Copy)", the control information CV indicating "11" is generated.

A controller (not shown) of the output apparatus 1 determines which copying control information is to be generated according to the corresponding control state in the video copying-control-information generator 13 in response to an instruction input from an operator (user) of this output apparatus 1 through, for example, a keyboard provided for the output apparatus 1.

In this embodiment, the video copying-control-information generator 13 generates "00" when the video signal Vd and the audio signal Au supplied to this output apparatus 1 correspond to "copying allowed (Copy Free)", and generates "11" when the video signal Vd and the audio signal Au correspond to "copying is absolutely prohibited (Never Copy)".

When the video signal Vd and the audio signal Au supplied to this output apparatus 1 correspond to "copying is allowed for only one generation (Copy Once)", the video copying-control-information generator 13 outputs "01" representing that "copying is prohibited for further generations (No More Copies)" rather than "10". This eliminates the need for overwriting the additional information to be superimposed on the video signal as digital watermark information, which will be discussed below.

Not only the copying control information CV from the video copying-control-information generator 13, but also relating information RS generated in the relating-information generator 15, is supplied to the video additional-information forming unit 14. In this embodiment, the relating-information generator 15 is formed of a random-number generator. When the video signal Vd and the audio signal Au are received and processed, the relating-information generator 15 generates a random number and supplies it to the video additional-information forming unit 14 and the audio additional-information forming unit 21 as the relating information for the additional information, thereby making it possible to superimpose the relating information RS, as well as the additional information, on the video signal Vd and the audio signal Au as the digital watermark information.

By superimposing the relating information RS on the video signal Vd and the audio signal Au, as discussed above, it is possible to check, for example, in an information signal recording apparatus, which will be discussed below, whether the additional information added to the video signal is related to that to the audio signal according to whether the video signal and the audio signal have the same relating information. That is, it can be determined whether the video signal having the additional information superimposed and the audio signal having the additional information superimposed are associated with each other and whether they can be independently used.

Figure 2:
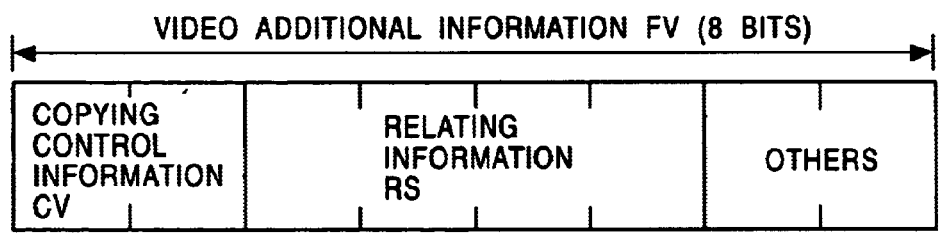
FIG. 2 illustrates video additional information to be superimposed on a video signal as digital watermark information.

Then, the video additional-information forming unit 14 forms additional information to be superimposed on the video signal Vd based on the copying control information output from the video copying-control-information generator 13 and the relating information RS output from the relating-information generator 15. FIG. 2 illustrates video additional information FV to be formed in the video additional-information forming unit 14 of the output apparatus 1 of this embodiment.

The video additional-information forming unit 14 forms, as shown in FIG. 2, eight-bit video additional Information FV containing the copying control information CV and the relating information RS, and supplies the video additional information FV to the video WM superimposition unit 12. It should be noted that the last two bits of the remaining portion of the video additional information FV are unused in this embodiment.

Alternatively, by supplying supplementary information, such as information indicating the supply source of the video signal, to the video additional-information forming unit 14, the supplementary information may be inserted into the last two bits of the video additional information FV. In this manner, various types of information may be inserted into the video additional information FV.

Then, the eight-bit video additional information FV formed in the video additional-information forming unit 14 is supplied to the video WM superimposition unit 12. In this embodiment, the video WM superimposition unit 12 performs spread spectrum processing on the video additional information FV by using a PN (Pseudorandom Noise)-sequence code (hereinafter referred to as the "PN code"), thereby forming digital watermark information.

Figure 3:
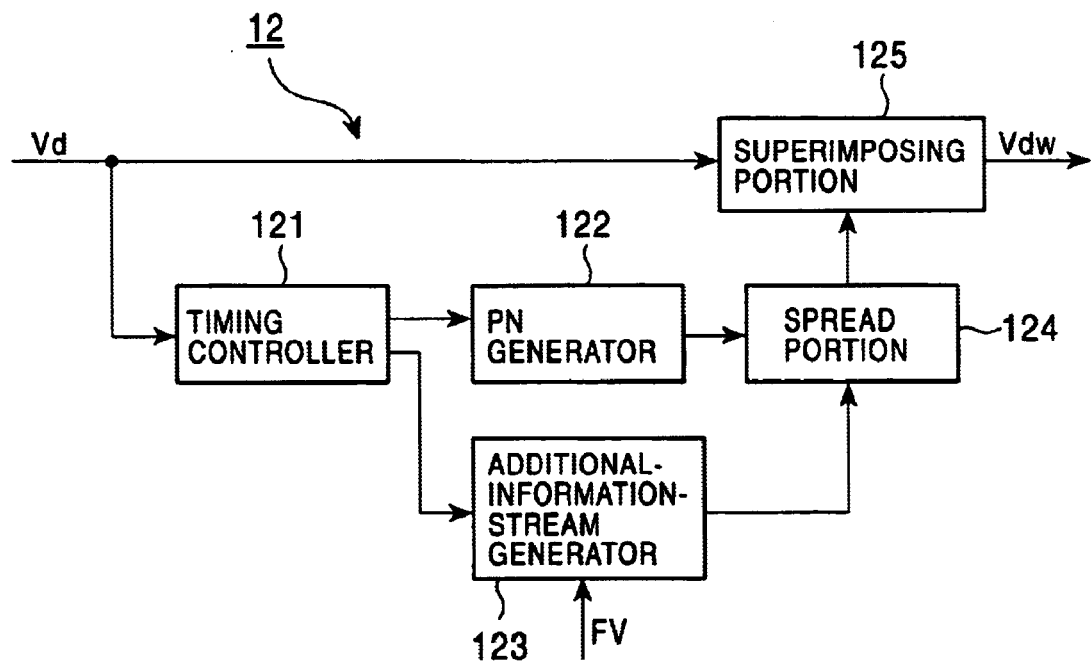
FIG. 3 is a block diagram illustrating a video digital watermark-information (WM) superimposition unit of the information signal output apparatus shown in FIG. 1.

FIG. 3 is a block diagram illustrating the video WM superimposition unit 12 of this embodiment. In this embodiment, the video WM superimposition unit 12 includes a timing controller 121, a PN generator 122, an additional-information-stream generator 123, a spread spectrum portion (hereinafter simply referred to as the "spread portion) 124, and a WM superimposing portion (hereinafter simply referred to as the "superimposing portion") 125.

The video signal Vd from the input terminal 11 is supplied to the timing controller 121 and the superimposing portion 125 of the video WM superimposition unit 12. The timing controller 121 detects the vertical synchronizing timing and the horizontal synchronizing timing from the information contained in the video signal, and by using the detected timing as reference signals, the timing controller 121 generates various timing signals, such as a PN-code reset timing signal RE, a PN generating enable signal EN, and a PN clock signal PNCLK.

The PN-code reset timing signal (reset signal) RE indicates the start timing of generating the PN code. The PN generating enable signal (enable signal) EN represents the interval in which the PN code for performing spread spectrum on the video additional information is generated. The PN clock signal PNCLK indicates, in this embodiment, the timing at which one chip of the PN code is generated, for example, one chip of the PN code is generated per pixel.

Among the timing signals generated in the timing controller 121, the reset signal RE, the enable signal EN, and the PN clock signal PNCLK are supplied to the PN generator 122, and the enable signal EN and the PN clock signal PNCLK are supplied to the additional-information-stream generator 123.

The PN generator 122 has multiple stages of shift registers, though they are not shown, and is formed of a few exclusive-OR circuits for computing appropriate tap outputs of the shift registers. The PN generator 122 generates the PN-code sequence PS according to the reset signal RE, the enable signal EN, and the clock signal PNCLK supplied from a the timing generator 121.

The PN generator 122 is reset by the reset signal RE in a cycle which synchronizes with the vertical synchronizing signal, such as in one frame cycle, and generates the PN-code sequence PS of a predetermined code pattern from the head. The PN generator 122 generates the PN-code sequence PS according to the clock signal PNCLK only when the PN code can be generated (enable state) by the enable signal EN.

The additional-information-stream generator 123 generates video additional information stream FSV according to the clock signal PNCLK by switching, for example, the individual bits of the eight-bit video additional information at the timing of the enable signal EN. More specifically, by switching the individual bits of the video additional information at the timing of the enable signal EN, the video additional information is output when the PN-code sequence PS is generated in the PN generator 122, thereby generating the video additional information stream FSV.

Then, the PN-code sequence PS from the PN generator 122 and the video additional information stream FSV from the additional-information-stream generator 123 are supplied to the spread portion 124. In the spread portion 124, the spread-spectrum operation is performed on the video additional information stream FSV by the PN-code sequence PS, resulting in the video additional information FV, which is then supplied to the superimposing portion 125 as the digital watermark information.

The superimposing portion 125 superimposes the digital watermark information indicating the video additional information FV output from the spread portion 124 on the video signal Vd, and supplies the video signal Vdw having the the digital watermark information superimposed to the video compression unit 16. As stated above, in the output apparatus 1 of this embodiment, the video WM superimposition unit 12 forms the digital watermark information, which is a spread spectrum signal, and outputs the video signal having the digital watermark information superimposed.

Subsequently, the video compression unit 16 compresses the video signal Vdw having the digital watermark information superimposed according to, for example, the moving picture experts group (MPEG) method, and supplies the compressed video signal to the CGMS-information addition unit 17. The CGMS-information addition unit 17 generates CGMS information in response to an instruction from a user of this output apparatus 1, and superimposes the CGMS information on the video signal Vdw. The CGMS information is two-bit copying control information, as stated above.

The video signal Vdw having the CGMS information output from the CGMS-information addition unit 17 is supplied to the multiplexer 22. Not only the compressed video signal Vdw having the digital watermark information superimposed, but also a compressed audio signal having additional information superimposed as the digital watermark information is supplied to the multiplexer 22, which is described below.

More specifically, the audio signal Au, which is associated with the video signal Vd supplied to the output apparatus 1, is also supplied to the output apparatus 1 via the input terminal 18, and is then supplied to the audio WM superimposition unit 19. Meanwhile, as in the case of the video copying-control-information-generator 13, the audio copying-control-information generator 20 generates copying control information CA to be superimposed on the audio signal Au supplied to the output apparatus 1, and supplies the control information CA to the audio additional-information forming unit 21.

In this embodiment, as in the video copying-control-information generator 13, the audio copying-control-information generator 20 is able to generate two-bit copying control information CA corresponding to the following four copying control states. When the control state is 1, "Copying is allowed (Copy Free)", the control information CA indicating "00" is generated. When the control state is 2, "Copying is allowed for only one generation (Copy Once)", the control information CA indicating "10" is generated. When the control state is 3. "Copying is prohibited for further generations (No More Copies)", the control information CA indicating "01" is generated. When the control state is 4, "Copying is absolutely prohibited (Never Copy)", the control Information CA indicating "11" is generated.

In this audio copying-control-information generator 20, as well as in the above-described video copying-control-information generator 13, a controller (not shown) of the output apparatus 1 determines which copying control information is to be generated according to the corresponding control state in response to an instruction input from an operator (user) of this output apparatus 1 through, for example, a keyboard provided for the output apparatus 1.

In the output apparatus 1 of this embodiment, the audio copying-control-information generator 20 generates "00" when the video signal Vd and the audio signal Au supplied to this output apparatus 1 correspond to the state "copying allowed (Copy Free)", and generates "10" when the video signal Vd and the audio signal Au correspond to the state "copying is allowed for only one generation (Copy Once)", and generates "11" when the video signal Vd and the audio signal Au correspond to the state "copying is absolutely prohibited (Never Copy)".

In the above-described video copying-control-information generator 13, when the video signal Vd and the audio signal Au correspond to "copying is allowed for only one generation (Copy Once)", the video copying-control-information generator 13 outputs "01" representing that "copying is prohibited for further generations (No More Copies)" rather than "10". In this case, however, the audio copying-control-information generator 20 generates "10" when the video signal Vd and the audio signal Au correspond to "copying is allowed for only one generation (Copy Once)".

As stated above, additional information superimposed on a video signal as digital watermark information is not overwritten, and only additional information superimposed on an audio signal as digital watermark information is overwritten. This is for the following reason. It is relatively difficult to overwrite additional information superimposed on a video signal as digital watermark information, since the circuit would be larger. It is relatively easy, however, to overwrite additional information superimposed on an audio signal as digital watermark information in comparison with a video signal.

Figure 4:
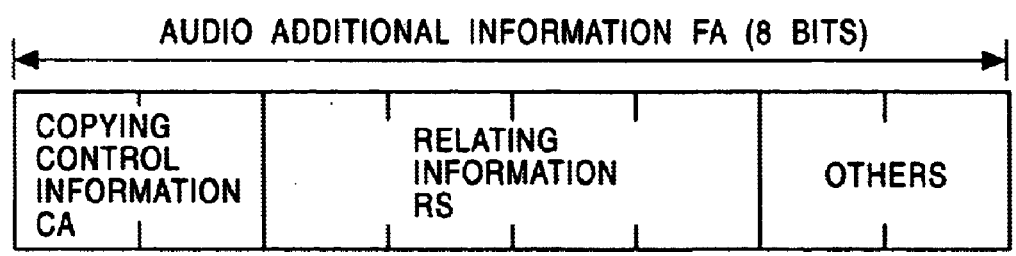
FIG. 4 illustrates audio additional information to be superimposed on an audio signal as digital watermark information.

As discussed above, the relating information RS from the relating-information generator 15 is also supplied to the audio additional-information forming unit 21. The audio additional-information forming unit 21 forms additional information to be superimposed on the audio signal Au based on the copying control information CA from the audio copying-control-information generator 20 and the relating information RS from the relating-information generator 15. FIG. 4 illustrates audio additional information FA to be formed in the audio additional-information forming unit 21.

As illustrated in FIG. 4, the audio additional-information forming unit 21 forms eight-bit audio additional information FA containing the copying control information CA and the relating information RS, and supplies the additional information FA to the audio WM superimposition unit 19. The remaining portion of the audio additional information FA is unused bits in this embodiment. However, as in the case of the aforementioned video additional information FV, information indicating, for example, the supply source of the audio signal, may be inserted into the remaining portion of the audio additional information FA.

Then, the eight-bit audio additional information FA formed in the audio additional-information forming unit 21 is supplied to the audio WM superimposition unit 19. In this embodiment, the audio WM superimposition unit 19 performs a modified discrete cosine transform (hereinafter referred to as "MDCT") so as to determine an MDCT coefficient. By using this MDCT coefficient, the audio WM superimposition unit 19 superimposes the audio additional information on the portion of the audio signal which is imperceptible in terms of both the frequency domain and the time domain.

Figure 5:
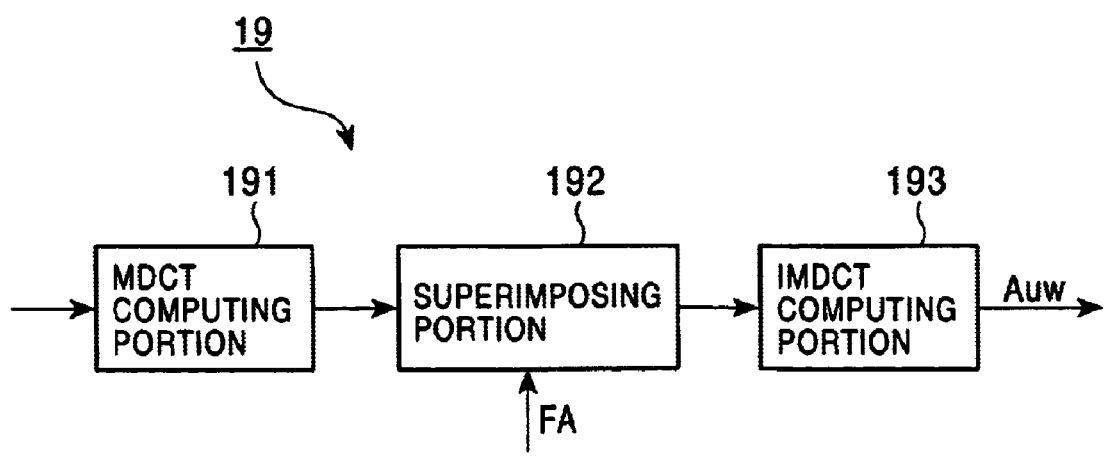
FIG. 5 is a block diagram illustrating an audio WM superimposition unit of the information signal output apparatus shown in FIG. 1.

FIG. 5 is a block diagram illustrating the audio WM superimposition unit 19 of this embodiment. In this embodiment, the audio WM superimposition unit 19 is formed of an MDCT computing portion 191, a superimposing portion 192, and an inverse MDCT (IMDCT) computing portion 193.

The audio signal Au from the input terminal 18 is supplied to the MDCT computing portion 191 of the audio WM superimposition unit 19. In the MDCT computing portion 191, MDCT computation is performed on the audio signal Au to determine the MDCT coefficient. The determined MDCT coefficient is then supplied to the superimposing portion 192.

Upon receiving the MDCT coefficient from the MDCT computing portion 191 and the audio additional information FA from the audio additional-information forming unit 21, the superimposing portion 192 codes the audio additional information FA by performing frequency shifting and inverse transforming so as to superimpose the audio additional information FA on the audio signal as the digital watermark information. Details of the method, used in this example, for forming the digital watermark information by using the MDCT and for superimposing it on the audio signal are discussed in Japanese Patent Application No. 11-076944.

The output signal having the audio additional information FA superimposed as the digital watermark information output from the superimposing portion 192 is supplied to the IMDCT computing portion 193. The IMDCT computing portion 193 performs IMDCT computation, which is the reverse processing to the MDCT computation performed by the MDCT computing portion 191, on the output signal from the superimposing portion 192, thereby regenerating original audio signal as the output signal. The reproduced audio signal Auw is then supplied to the audio compression unit 22.

The audio compression unit 22 compresses the audio signal Auw having the audio additional information FA superimposed according to, for example, the MPEG audio method, and supplies the compressed audio signal to the multiplexer 23. In this manner, the video signal Vdw and the audio signal Auw having the copying control information superimposed, which is used for copyright protection, as the digital watermark information are supplied to the multiplexer 23.

The multiplexer 23 multiplexes the video signal Vdw with the audio signal Auw. The multiplexed signal of the video signal and the audio signal is then supplied to the scrambler 24. The scrambler 24 performs predetermined scrambling processing (encryption processing) on the supplied signal, and supplies the encrypted signal to the modulator 25. The modulator 25 modulates the signal output from the scrambler 24 and outputs the modulated signal.

If this output apparatus 1 is used as a broadcast apparatus in a broadcast station, an output processing unit is provided at the stage subsequent to the modulator 25, and in this output processing unit, a signal to be output is amplified and broadcast. Alternatively, if this output apparatus 1 is used as an apparatus for recording the video signal and the audio signal on a recording medium, such as a DVD, a recording processing unit is provided at the stage subsequent to the modulator 25, and by this recording processing unit, the video signal and the audio signal are recorded on, for example, a recording medium.

According to the above description, the output apparatus 1 of this embodiment superimposes the copying control information for copyright protection on both the video signal and the audio signal, which are associated with each other, as the digital watermark information, and outputs them. In this output apparatus 1, the video copying control information and the audio copying control information may indicate the same copying control state or different copying control states. Alternatively, only one of the video copying control information and the audio copying control information may be generated.

In this manner, since the output apparatus 1 has both the video copying-control-information generator 13 and the audio copying-control-information generator 20, as shown in FIG. 1, the video copying control information and the audio copying control information can be flexibly generated.

As will be described below, restricted-use control, such as copying control, is performed by using both the digital watermark information superimposed on the video signal Vd and the digital watermark information, superimposed on the audio signal Au, thereby improving the reliability of restricted-use control on the video signal and the audio signal.

[Set-top box]

Figure 6:
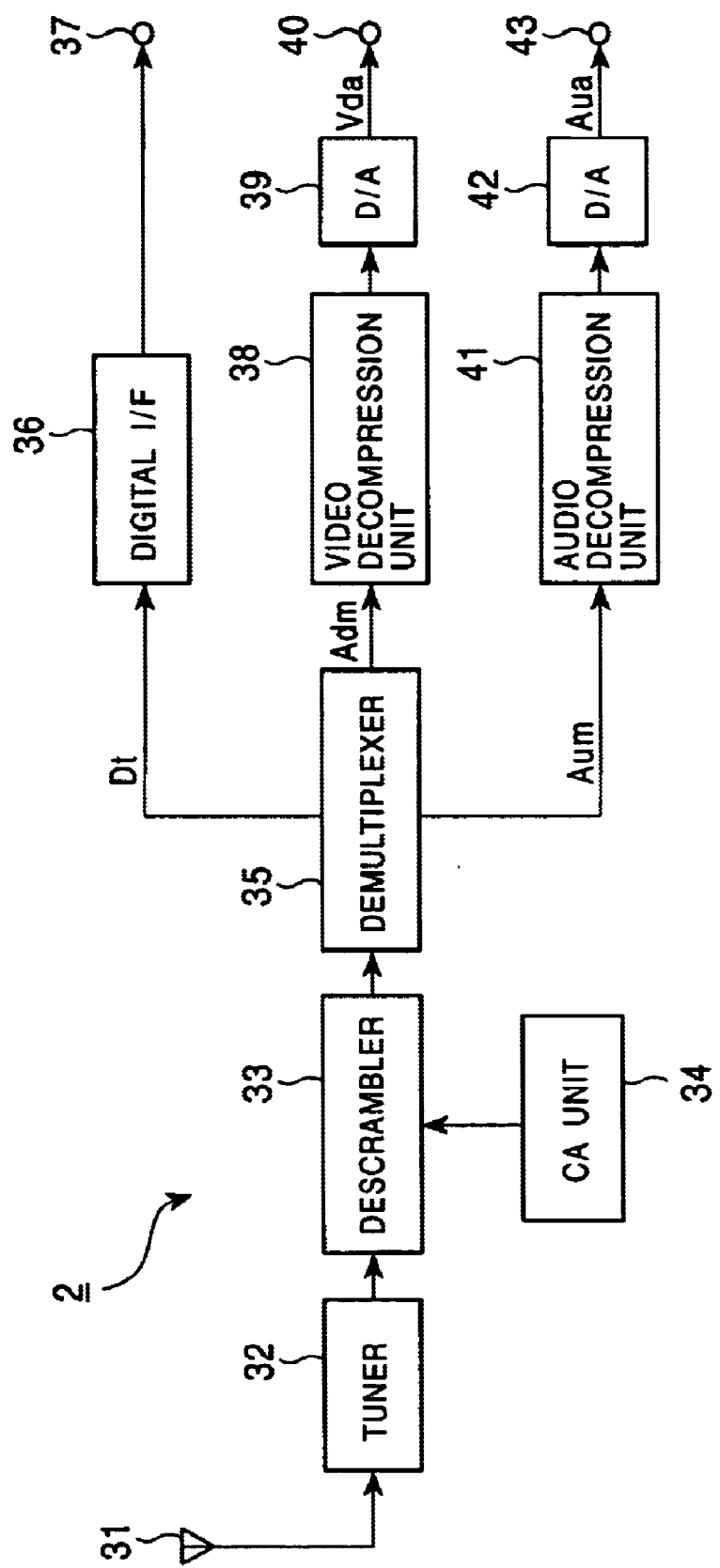
FIG. 6 illustrates a set-top box (broadcasting receiver)

FIG. 6 is a block diagram illustrating a set-top box (receiver) for receiving broadcast signals to be broadcast from a broadcasting apparatus to which the above-described information signal output apparatus shown in FIG. 1 is applied.

In a set-top box 2 of this embodiment, broadcast radio waves transmitted from a broadcasting station or transmitted via an artificial satellite are received by an antenna 31 and are supplied to a tuner 32. The tuner 32 selects a target broadcast signal in response to an instruction input from a user of this set-top box 2 and supplies the selected signal to a descrambler 33.

A conditional access unit (indicated as CA unit in FIG. 6) 34 is connected to, in this embodiment, a conditional access center (CA center) in a broadcasting station via, for example, a communication network. Then, communications are performed between the CA unit of the set-top box 2 and the CA center. A user to be charged, who is a subscriber, is provided with an encryption key for decrypting the scrambled broadcast signal. The CA unit 34 supplies the provided encryption key to the descrambler 33.

The descrambler 33 performs descrambling (decryption) processing based on the encryption key supplied from the CA unit 34, and supplies the decrypted (plain text) broadcast signal to a demultiplexer 35. The demultiplexer 35 demultiplexes the broadcast signal into a video signal Vdm, an audio signal Aum, and data Dt, such as the CGMS information. In this embodiment, the data Dt, such as the CGMS information added to, for example, the video signal Vd, is output via a digital interface (indicated by digital I/F in FIG. 6) and an output terminal 37 for digital signals.

The video signal Vdm extracted from the broadcast signal is supplied to a video decompression unit 38 and is decompressed into the original baseband signal. Thereafter, the baseband signal is converted into an analog video signal Vda in a digital-to-analog (D/A) converter 39 and is output via an output terminal 40 for analog signals. Similarly, the audio signal Aum extracted from the broadcast signal is supplied to an audio decompression unit 41 and is decompressed into the original baseband signal. Then, the baseband signal is converted into an analog audio signal Aua in a D/A converter 42, and is output via an output terminal 43 for analog signals.

As discussed above, in this embodiment, in the set-top box 2, after both the video signal and the audio signal are decompressed, they are converted into analog signals and are output. Then, the analog signals are supplied to a recording apparatus. That is, in this set-top box 2, the video signal and the audio signal having the digital watermark information superimposed are output as they are.

Additionally, in the set-top box 2 of this embodiment, CGMS information added to the video signal or SCMS information added to the audio signal can be output as digital data separately from the video signal or the audio signal, and can be supplied to an apparatus to which the information is to be output.

In this embodiment, the CGMS information is output via the digital interface 36. However, this is not exclusive, and a digital video signal having CGMS information added and having digital watermark information superimposed and an audio signal having SCMS information added and having digital watermark information superimposed may be output via the digital interface 36.

In this case, the type of apparatus to which the signals are to be output may be checked by the function of the digital interface 36. If the apparatus is a recording apparatus and if CGMS information or SCMS information indicate that copying is not allowed, the digital interface 36 may prevent the signals from being output. That is, the copyright protection may be performed appropriately based on CGMS information. SCMS information, and information of the apparatus to which the digital video signal and the digital audio signal are to be supplied.

[Information signal recording apparatus]

Figure 7:
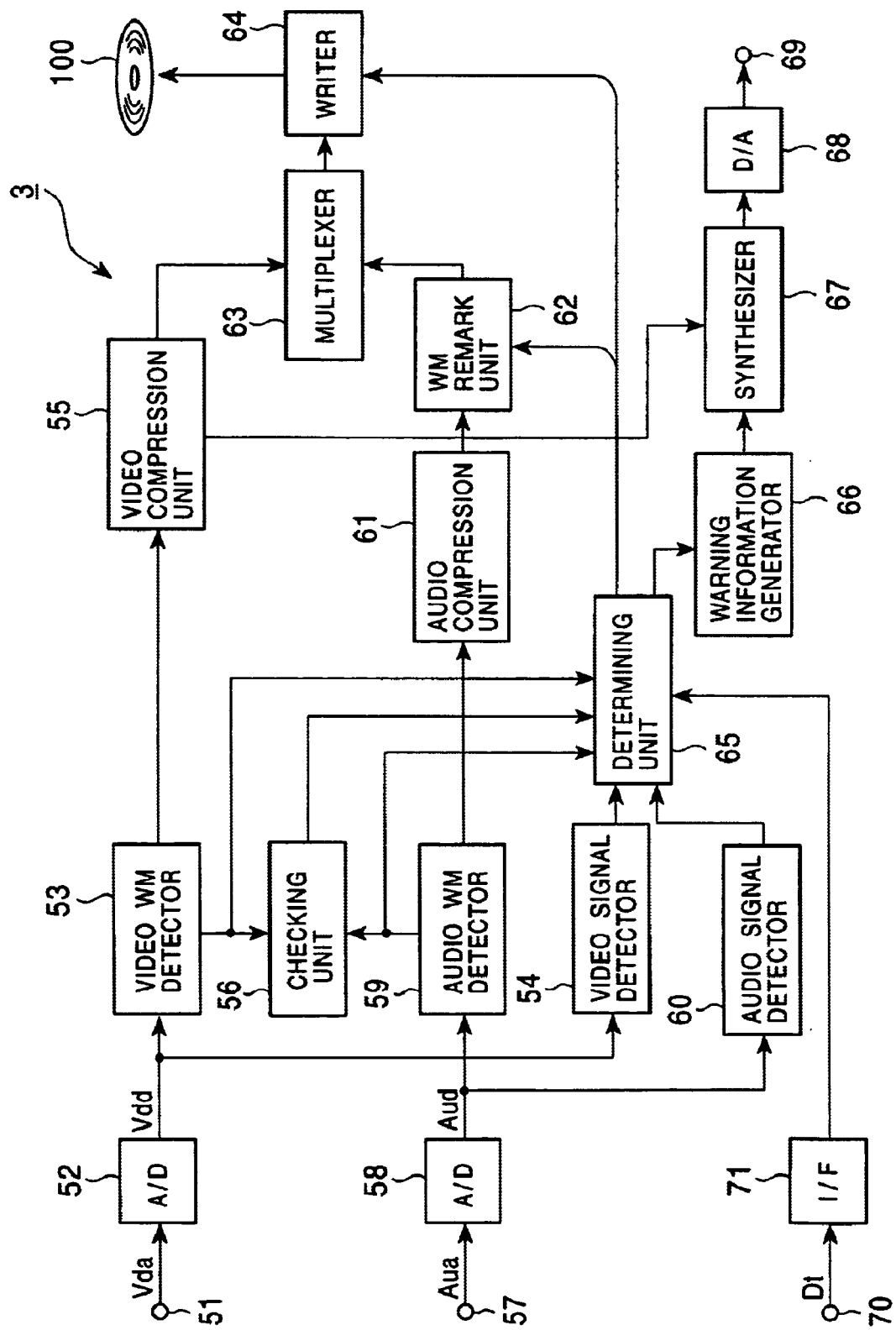
FIG. 7 is a block diagram illustrating an information signal recording apparatus as an information signal processing apparatus according to an embodiment of the present invention.

FIG. 7 is a block diagram illustrating an information signal recording apparatus (hereinafter simply referred to as the "recording apparatus") 3 incorporating the information signal processing apparatus of the present invention for receiving the analog video signal and the analog audio signal output from the above-described set-top box 2 and recording the signals on a recording medium 100. In the recording apparatus 3 of this embodiment, the recording medium 100 is a rewritable disc, such as a DVD.

The recording apparatus 3 includes, as shown in FIG. 7, an input terminal 51 for analog video signals, an analog-to-digital (A/D) converter 52, a video WM detector 53, a video signal detector 54, a video compression unit 55, a checking unit 56, an input terminal 57 for analog audio signals, an A/D converter 58, an audio WM detector 59, an audio signal detector 60, an audio compression unit 61, a WM remark unit 62, a multiplexer 63, an writer 64, a determining unit 65, a warning information generator 66, a synthesizer 67, a D/A converter 68, an output terminal 69 for analog signals, an input terminal 70 for digital signals, and a digital interface 71.

The analog video signal Vda output from the set-top box 2 shown in FIG. 6 is supplied to the A/D converter 52 via the input terminal 51 of the recording apparatus shown in FIG. 7. The A/D converter 52 converts the analog video signal Vda into a digital video signal Vdd and supplies it to the video WM detector 53 and the video signal detector 54.

The video WM detector 53 supplies the video signal Vdd as it is to the video compression unit 55, and also detects the video additional information FV superimposed on the video signal Vdd as the digital watermark information, and supplies the detected video additional information FV to the checking unit 56 and the determining unit 65.

The video signal Vdd supplied to the video compression unit 55 via the video WM detector 53 is compressed in the video compression unit 55 according to, for example, an MPEG method, and is then supplied to the multiplexer 63.

Figure 8:
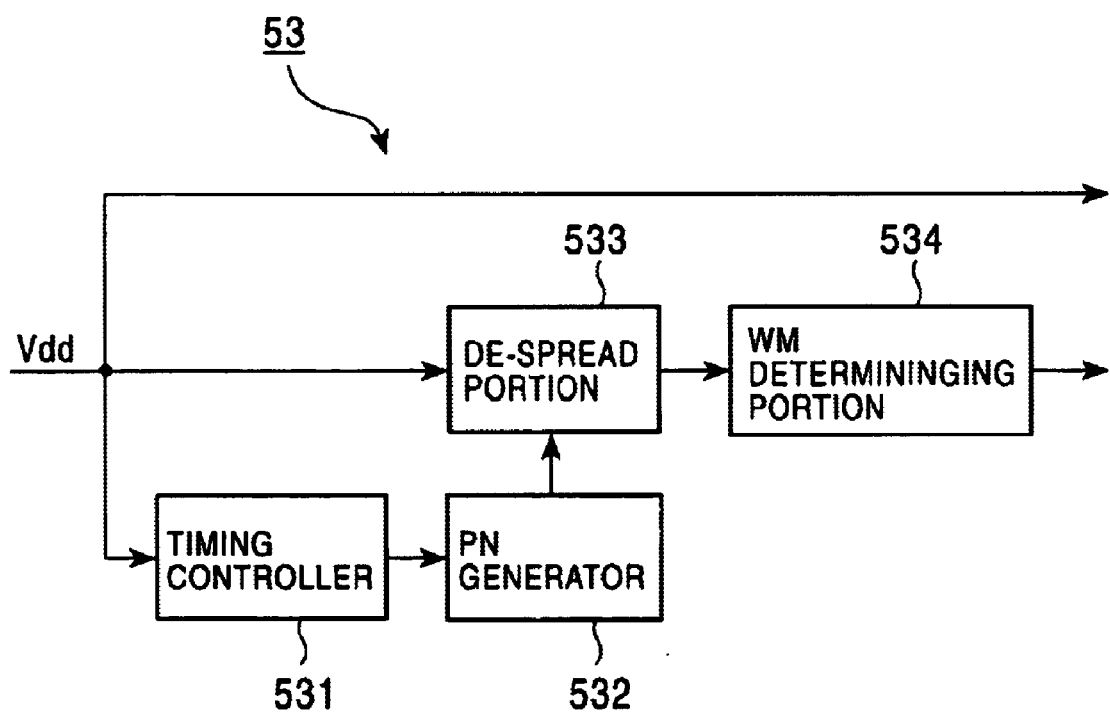
FIG. 8 is a block diagram illustrating a video WM detector of the information signal recording apparatus shown in FIG. 7.

In the video WM detector 53, the video additional information FV superimposed on the video signal Vdd as the digital watermark information is detected, as discussed below. FIG. 8 is a block diagram illustrating the video WM detector 53 of the recording apparatus 3 of this embodiment. The video WM detector 53 is formed of, as shown in FIG. 8, a timing controller 531, a PN generator 532, a de-spread portion 533, and a WM determining portion 534.

As stated above, the video signal Vdd output from the A/D converter 52 is supplied to the video compression unit 55 as it is via the video WM detector 53, and is also supplied to the timing generator 531 and the de-spread portion 533 of the video WM detector 53.

The timing controller 531 of the video WM detector 53 is configured similarly to the timing controller 121 of the video WM superimposition unit 12 of the output apparatus 1 discussed with reference to FIGS. 1 and 3. The timing controller 531 detects the vertical synchronizing timing and the horizontal synchronizing timing from the information contained in the video signal Vdd, and by using the detected timing as reference signals, it creates various timing signals, such as a PN-code reset timing signal RE, a PN generating enable signal EN, and a PN clock signal PNCLK.

That is, the timing controller 531 creates the reset signal RE, the enable signal EN, and the clock signal PNCLK for providing the same timing for the video signal Vdd as that when spread-spectrum operation is performed on the video additional information FV in the output apparatus 1, and supplies the timing signals to the PN generator 532.

The PN generator 532 is configured similarly to the PN generator 122 of the video WM superimposition unit 12 shown in FIG. 3. The PN generator 532 generates the same PN-code sequence PS for the video signal Vdd, based on the reset signal RE, the enable signal EN, and the clock signal PNCLK, at the same timing as that when the spread-spectrum operation is performed on the video additional information FV. The PN-code sequence PS is then supplied to the de-spread portion 533.

The de-spread portion 533 performs the de-spread spectrum operation by multiplying the video signal Vdd by the PN-code sequence PS from the PN generator 532 so as to extract the video additional information stream superimposed on the video signal Vdd as the digital watermark information. The de-spread portion 533 then supplies the video additional information stream to the digital watermark information determining portion (indicated by WM determining portion in FIG. 7) 534.

The WM determining portion 534 integrates the video additional information stream output from the de-spread portion 533, and determines the original eight-bit video additional information FV. The determined video additional information FV is then supplied to the checking unit 56 and the determining unit 65. Simultaneously, in this embodiment, the WM determining portion 534 also detects the detection reliability of the video additional information FV, and supplies the corresponding information to the determining unit 65.

Figure 10:
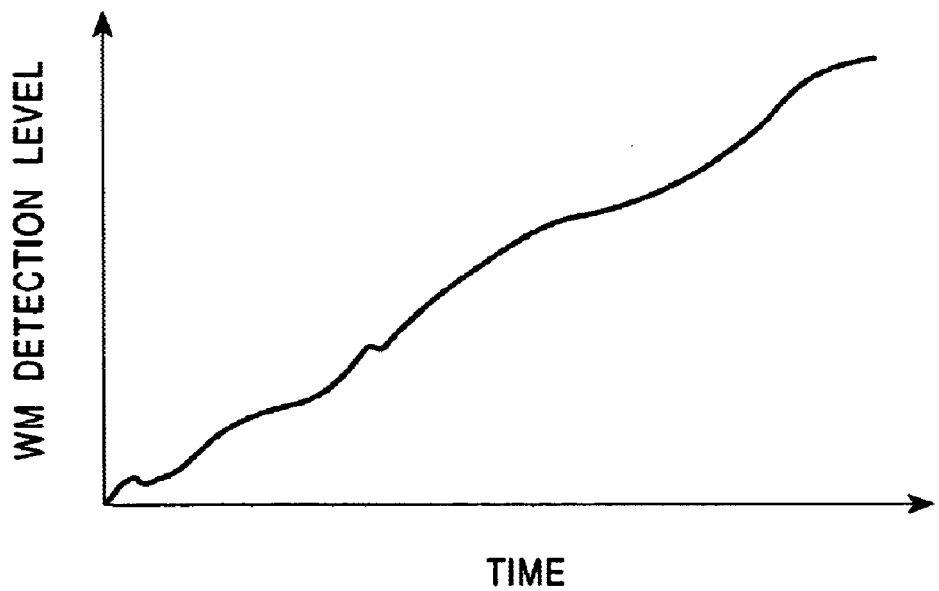
FIG. 10 is a diagram illustrating digital watermark information being stably detected.
Figure 11:
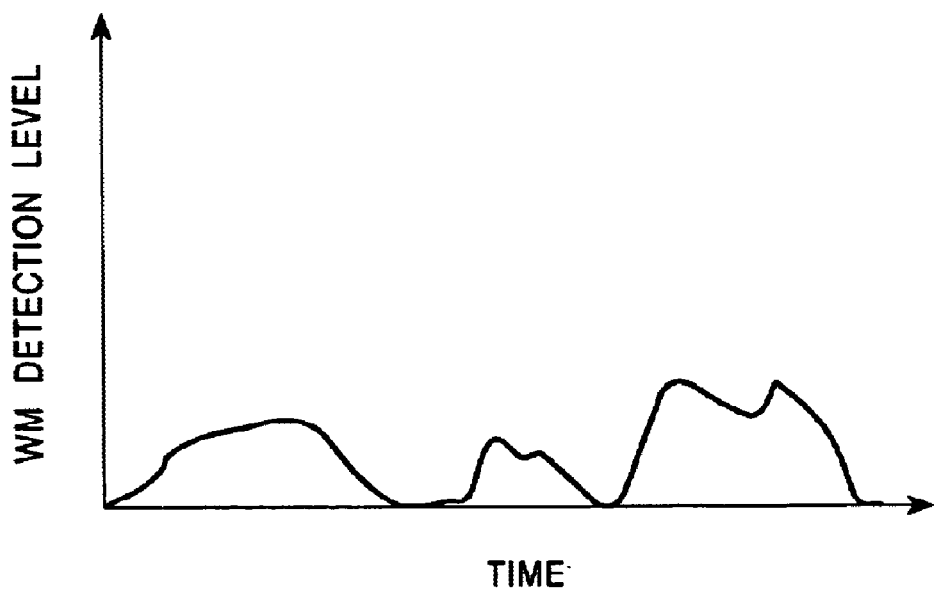
FIG. 11 is a diagram illustrating digital watermark information being unstably detected.

The information of the detection reliability of the video additional information indicates whether the video additional information FV has been detected stably or unstably. FIGS. 10 and 11 illustrate the detection reliability of the video additional information FV.

In this embodiment, the WM determining portion 534 integrates the information obtained from the de-spread portion 533. If the detection level of the integrated information gradually increases and the video additional information FV is always stably detected, as shown in FIG. 10, the detection reliability of the video additional information FV is high. The WM determining portion 534 thus determines that the video additional information FV has been detected correctly and precisely, and supplies it to the determining unit 65.

Conversely, by integrating the information obtained from the de-spread portion 533, if the detection level fluctuates, as shown in FIG. 11, so that the video additional information FV is only occasionally (unstably) detected, the detection reliability of the video additional information FV is low. It is thus determined that the additional information FV has been erroneously detected, and the detection result is reported to the determining unit 65.

The video signal detector 54, which receives the digital video signal Vdd from the A/D converter 52, monitors the level of the received signal and detects whether the video signal Vdd has been supplied, and reports the detection result to the determining unit 65.

By the provision of the video signal detector 54, when the video additional information FV is not detected, it can be checked whether the video additional information is not detected because it is not superimposed on the supplied video signal or the video additional information is not detected because the video signal is not supplied.

Meanwhile, the analog audio signal Aua output from the set-top box 2 shown in FIG. 6 is supplied to the A/D converter 58 via the input terminal 57 of the recording apparatus 3 shown in FIG. 7. The A/D converter 58 converts the analog audio signal Aua into a digital audio signal Aud and supplies it to the audio WM detector 59 and the audio signal detector 60.

The audio WM detector 59 supplies the audio signal Aud to the audio compression unit 61, and also detects the audio additional information FA superimposed on the audio signal Aud as the digital watermark information, and supplies the detected audio additional information FA to the checking unit 56 and the determining unit 65.

The audio signal Aud supplied to the audio compression unit 61 via the audio WM detector 59 is compressed in the audio compression unit 61 according to, for example, an MPEG audio method, and is then supplied to the digital watermark information remark unit (indicated by WM remark unit in FIG. 7) 62.

Figure 9:
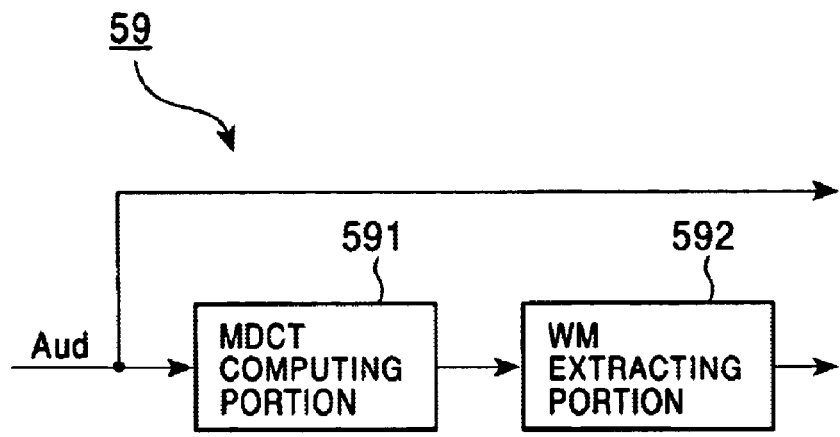
FIG. 9 is a block diagram illustrating an audio WM detector of the information signal recording apparatus shown in FIG. 7.

The audio WM detector 59 detects the audio additional information FA superimposed on the audio signal Aud as the digital watermark information, as described below. FIG. 9 is a block diagram illustrating the audio WM detector 59 of the recording apparatus 3 of this embodiment. The audio WM detector 59 of this embodiment has, as shown in FIG. 9, an MDCT computing portion 591, and a digital-watermark-information extracting portion (indicated by WM extracting portion in FIG. 9) 592.

The MDCT computing portion 591 of the audio WM detector 59 is configured similarly to the MDCT computing portion 191 of the audio WM superimposition unit 19 of the output apparatus 1 described with reference to FIGS. 1 and 5. The MDCT computing portion 591 performs MDCT computation on the supplied audio signal Aud to determine the MDCT coefficient, and supplies the determined MDCT coefficient to the WM extracting portion 592.

The WM extracting portion 592 extracts the digital watermark information from the MDCT coefficient corresponding to the portion on which the audio additional information FA is superimposed as the digital watermark information, and integrates the extracted digital watermark information, thereby extracting the audio additional information FA superimposed on the audio signal Aud as the digital watermark information. The WM extracting portion 592 then supplies the extracted audio additional information FA to the checking unit 56 and the determining unit 65.

As in the WM determining portion 534 of the video WM detector 53, the WM extracting portion 592 of the audio WM detector 59 determines the detection reliability of the audio additional information FA superimposed on the audio signal Aud and supplies the determination result to the determining unit 65.

More specifically, the WM extracting portion 592 of the audio WM detector 59 makes a determination in the following manner. If the audio additional information FA superimposed on the audio signal Aud as the digital watermark information has been stably detected, as illustrated in FIG. 10, the detection reliability is determined to be high. If the audio additional information FA has been unstably detected, as shown in FIG. 11, the detection reliability is determined to be low.

Additionally, the audio signal detector 60, which receives the digital audio signal Aud from the A/D converter 58, monitors the level of the supplied audio signal, and detects whether the audio signal Aud has been supplied and reports the detection result to the determining unit 65.

By the provision of the audio signal detector 60, when the audio additional information FA is not detected, it can be checked whether the audio additional information FA is not detected because it is not superimposed on the supplied audio signal Aud or because the audio signal Aud is not supplied.

In this embodiment, the CGMS information extracted from the video signal in the demultiplexer 35 of the above-described set-top box 2 is output via the digital interface 36 and the digital-signal output interface 37. The CGMS information output from the set-top box 2 is received by the recording apparatus 3 via the digital-signal input terminal 70 and the digital interface 71 of the recording apparatus 3, and is supplied to the determining unit 65.

As stated above, the checking unit 56, which receives the video additional information FV (see FIG. 2) detected in the video WM detector 53 and the audio additional information FA (see FIG. 4) detected in the audio WM detector 59, checks the relating information RS of the video additional information FV against the relating information RS of the audio additional information FA. The checking unit 56 then supplies to the determining unit 65 the checking result indicating whether the relating information RS of the video additional information FV and that of the audio additional information FA are the same and both items of the additional information are related.

The determining unit 65 then comprehensively determines whether the video signal Vda and the audio signal Aua supplied to the recording apparatus 3 can be copied on the disc 100 based on the following items of information: the checking result output from the checking unit 56, the video additional information FV and the information indicating the detection reliability output from the video WM detector 53, the audio additional information FA and the information indicating the detection reliability output from the audio WM detector 59, the information indicating the presence or the absence of the video signal from the video signal detector 54, and the information indicating the presence or the absence of the audio signal from the audio signal detector 60.

FIG. 12 illustrates a determination logical table used in the determining unit 65 of the recording apparatus 3 of this embodiment. The determining unit 65 determines according to the logical table shown in FIG. 12 whether the video signal Vda and the audio signal Aua supplied to the recording apparatus 3 can be copied.

In this embodiment, case 8 shown in the logical table shown in FIG. 12 is a specific case. As discussed above, in the output apparatus 1 shown in FIG. 1, when the video signal and the audio signal to be output are allowed to be copied for only one generation, "01" representing that "copying is prohibited for further generations (No More Copies)" is superimposed on the video signal as the copying control information, while 10% representing that "copying is allowed for only one generation (Copy Once)" is superimposed on the audio signal as the copying control information.

Thus, in the event of case 8, i.e., when the copying control information superimposed on the video signal as the digital watermark information (indicated by video digital watermark in FIG. 12) is "01" representing that "copying is prohibited for further generations (No More Copies)", and the copying control information (indicated by audio digital watermark in FIG. 12) superimposed on the audio signal as the digital watermark information is "10" representing that "copying is allowed for only one generation (Copy Once)", the determining unit 65 determines that the video signal and the audio signal can be copied for only one generation. In this case, the determining unit 65 determines that the video signal and the audio signal can be copied for only one generation on the condition that the relating information RS of the additional information FV detected from the video signal coincides with the relating information RS of the additional information FA extracted from the audio signal.

In this case, the determining unit 65 supplies a control signal to the WM remark unit 62 so as to give an instruction to overwrite the copying control information of the additional information FA superimposed as the digital watermark information, indicating that copying is allowed for only one generation, by the information indicating that copying is prohibited for further generations. The determining unit 65 also supplies a control signal to the writer 64 to perform a writing operation.

The WM remark unit 62 overwrites (increments) the copying control information superimposed on the audio signal output from the audio compression unit 61, indicating that copying is allowed for only one generation, by the information indicating that copying is prohibited for further generations. The audio signal having the overwritten copying control information superimposed is supplied to the multiplexer 63. The multiplexer 63 then multiplexes the video signal from the video compression unit 55 with the audio signal from the WM remark unit 62, and supplies the multiplexed signal of the video signal and the audio signal to the writer 64. The writer 64 then records the multiplexed signal on the disc 100.

In this cases the copying control information superimposed on the video signal as the digital watermark information originally indicates that copying is prohibited for further generations. Accordingly, the additional information, such as the copying control information, superimposed on the video signal can be recorded on the disc 100 without the need to overwrite it.

In this embodiment, if the video signal and the audio signal which can be copied for only one generation have been copied on the disc 100, both the copying control information superimposed on the video signal and that superimposed on the audio signal indicate that copying is prohibited from the first generation copy. Accordingly, in this case, the video signal and the audio signal copied on the disc 100 are not allowed to be copied any more on another recording medium.

As discussed above, the reason for overwriting only the additional information superimposed on the audio signal is that it is easier to overwrite the additional information superimposed on the audio signal than that on the digital signal, and a minimal loss is incurred for the audio signal by overwriting the additional information.

This eliminates the need for loading a circuit for overwriting the copying control information superimposed on the video signal as the digital watermark information on the recording apparatus 3, thereby enhancing the simplicity of the circuit configuration of the recording apparatus 3.

For case 1 of the logical table shown in FIG. 12, both the copying control information superimposed on the video signal and that on the audio signal indicate that copying is not allowed (copying is prohibited). This is a correct state. The determining unit 65 thus determines that copying of the video signal and the audio signal is not allowed (is prohibited), and controls the writer 64 not to copy the video signal and the audio signal.

When it is determined that copying of the video signal and the audio signal is prohibited, the determining unit 65 controls the warning information generator 66 to generate warning information (message) for reporting that copying is prohibited. This warning information is supplied to the synthesizer 67. The video signal Vdd is also supplied to the synthesizer. 67 via the video WM detector 53.

The synthesizer 67 combines the video signal Vdd with the warning information. The synthesized signal is then supplied to the D/A converter 68. The synthesized signal is converted into an analog signal in the D/A converter 68 and is further supplied to, for example, an external monitor receiver, via the analog-signal output terminal 69. It is thus possible to report to the user according to the display information that copying of the video signal and the audio signal is prohibited.

In case 7 of the logical table shown in FIG. 12, both the copying control information superimposed on the video signal and that on the audio signal indicate that copying is not allowed (is prohibited) for further generations. This is a normal state. The determining unit 65 thus determines, as indicated by the two items of copying control information, that copying of the video signal and the audio signal is prohibited, and controls the writer 64 not to copy the video signal and the audio signal.

In case 14 shown in FIG. 12, both the copying control information superimposed on the video signal and that on the audio signal designate that copying is allowed. This is a correct state. The determining unit 65 thus determines, as indicated by the two items of copying control information, that the video signal and the audio signal can be copied (allowed), and controls the writer 64 to copy the video signal and the audio signal.

Case 20 in FIG. 12 represents the state in which copying control information is not superimposed on the video signal or the audio signal, and is thus equivalent to the state in which copying is allowed. This is a normal state. Then, the determining unit 65 determines that the video signal and the audio signal can be copied, and controls the writer 64 to copy the video signal and the audio signal.

Cases 2, 3, 4, 6, 9, 11, 12, and 13 in FIG. 12 designate that there is a discrepancy between the copying control information superimposed on the video signal and that on the audio signal. Since these cases are not normally generated, the determining unit 65 determines, based on the copying control information closer to a copy prohibiting state (tightly restricted copying control information), from the following three states, i.e., whether copying is not allowed (is prohibited), copying is allowed for only one generation, or copying is prohibited for further generations. According to this determination result, copying control of the video signal and the audio signal (copy-restricted control) is performed.

If there is a discrepancy between the copying control information superimposed on the video signal and that on the audio signal, such a control state is an abnormal state, as stated above. In this abnormal state, if the presence of the video signal and the audio signal is reliably detected and if the copying control information is stably detected from both the video signal and the audio signal, it may be considered that an attack was carried out to intentionally violate the copying restriction. In this case, the determining unit 65 may determine that copying is not allowed (is prohibited).

As discussed above, the presence or the absence of the video signal and the audio signal is detected in the video signal detector 54 and the audio signal detector 60, respectively, and the detection result is supplied to the determining unit 65. Concerning the digital watermark information, it is determined in the video WM detector 53 and the audio WM detector 59 whether the additional information superimposed on the video signal and that on the audio signal, respectively, have been stably detected, and the determination result is supplied to the determining unit 65. Thus, the copying control state can be determined taking into consideration the above-mentioned conditions.

In FIG. 12, cases 5, 10, 15, 16, 17, 18, and 19 indicate that the additional information superimposed as the digital watermark information is not detected from the video signal or the audio signal. In this case, the copying control state is determined based on the copying control information detected from the video signal or the audio signal, and a determination is made whether copying can be performed.

In FIG. 12, concerning cases 5 and 10 provided with symbol *1 in the determination column, consideration should be taken as to whether the additional information detected from the video signal has been stably detected. If it has been unstably detected, it is possible that the video signal has been erroneously detected. It is thus determined that the additional information superimposed on the video signal has not been detected.

In this case, both case 5 and case 10 are equivalent to case 20, and thus, the determining unit 65 determines that copying is allowed both for the video signal and the audio signal, and controls the writer 64 to copy both signals.

If the additional information has not been stably detected from one of the video signal and the audio signal, and if the additional information has been stably detected from the other signal, a detector for detecting the additional information, in this embodiment, the video WM detector 53 or the audio WM detector 59, may have been operated erroneously. In this case, the determining unit 65 may determine that both the video signal and the audio signal can be copied.

Additional information may be detected even though copying is allowed and there is no copying control information superimposed as digital watermark information. This phenomenon is referred to as "False Positive". It appears to a user that "False Positive" is a breakdown of the recording apparatus 3, and thus, the occurrence of erroneous detection should be suppressed to a sufficiently low level.

Accordingly, as discussed above, by checking whether the copying control information as the digital watermark information has been detected stably or unstably, the detection correlation of the digital watermark information for both the video signal and the audio signal can be observed. The determining unit 65 then determines whether the digital watermark information has been erroneously detected. It is thus possible to remarkably improve the reliability of copying control using the digital watermark information.

As stated above, the presence or the absence of the video signal and that of the audio signal are detected by the video signal detector 54 and the audio signal detector 60, respectively. If additional information as digital watermark information has not been detected from one of the video signal or the audio signal because of the absence of the signal itself, and if additional information has been stably detected from the other signal, it can be verified that only one of the signals is present. In this case, copying control can be performed on the existing information signal based on the detected additional information.

In contrast, it is now assumed that, although both the video signal and the audio signal are present, the additional information of only one of the video signal and the audio signal is detected, based on the additional information FV superimposed on the video signal, the additional information FA superimposed on the audio signal, the presence or the absence of the video signal, and the presence or the absence of the audio signal. In this case, the video signal and the audio signal may most probably have been illegally copied, and thus, it may be determined that copying is prohibited.

Between the video signal and the audio signal which are prohibited from being copied for further generations, only the video signal is to be illegally copied. In this case, if an audio signal which can be copied for only one generation, and which is unrelated to the video signal to be copied, is input into the recording apparatus 3, the video signal can be disadvantageously copied according to the logical table shown in FIG. 12. As discussed above, however, by checking the relating information RS of the additional information of the video signal against that of the audio signal, it can be determined whether the video signal and the audio signal are related to each other. It is thus possible to prevent the video signal from being illegally copied.

If it is determined that the video signal and the audio signal are not related to each other, the signals may most probably have been illegally copied, and thus, it may be unambiguously determined that copying is prohibited.

In this embodiment, the CGMS information output via the digital interface 36 and the output terminal 37 of the set-top box 2 is supplied to the determining unit 65 of the recording apparatus 3. Thus, for example, instead of the copying control information CA of the additional information FA added to the audio signal, the CGMS information received via the digital interface 71 may be used.

Alternatively, copying-restricted control can be performed by using the copying control information CV of the additional information FV superimposed on the video signal, the copying control information CA of the additional information FA superimposed on the audio signal, and the CGMS information received via the digital interface 71.

As discussed above, a determination is comprehensively made whether the video signal and the audio signal can be copied, and whether it is necessary to overwrite the copying control information, by utilizing the additional information superimposed on the video signal and the audio signal, the detection reliability of the additional information, the presence or the absence of the video signal and the audio signal, and the relating information. It is thus possible to perform highly reliable copyright protection resistant to the removal and tampering of the copying control information.

In this embodiment, a random number is used as the relating information. However, specific checking information is not necessary, and another type of data may be used as long as data superimposed on the video signal and the audio signal as the digital watermark information can be protected from being read by the user. Data which can indicate the relationship between the video signal and the audio signal, for example, the same data, may be sent to verify the relating information of the video signal against that of the audio signal.

As the relating information, various types of information for relating the additional information added to the video signal and that to the audio signal may be used, for example, individual ID information of a program to be transmitted (video signal or audio signal) or an ID code of a copyright holder may be used.

Additionally, the detection threshold of the digital watermark information superimposed on the video signal and the audio signal may be decreased from a conventional threshold so as to improve the detection speed. That is, even with a reduced detection threshold, the reliability of the detected additional information can be maintained to a high level since both the additional information superimposed on the video signal and that on the audio signal are used.

In this case, the threshold may be changed between when both the video signal and the audio signal are copied and when only one of the signals is copied. Accordingly, the detection reliability of the digital watermark information can be maintained. The video signal is not normally recorded singly, and thus, the recording of only the video signal may be prohibited.

The additional information superimposed on the video signal may be differentiated from that on the audio signal. Thus, the transmission capacity of the additional information may be varied between the video signal and the audio signal, thereby making it possible to transmit various types of information.

[Information signal playback apparatus]

Figure 13:
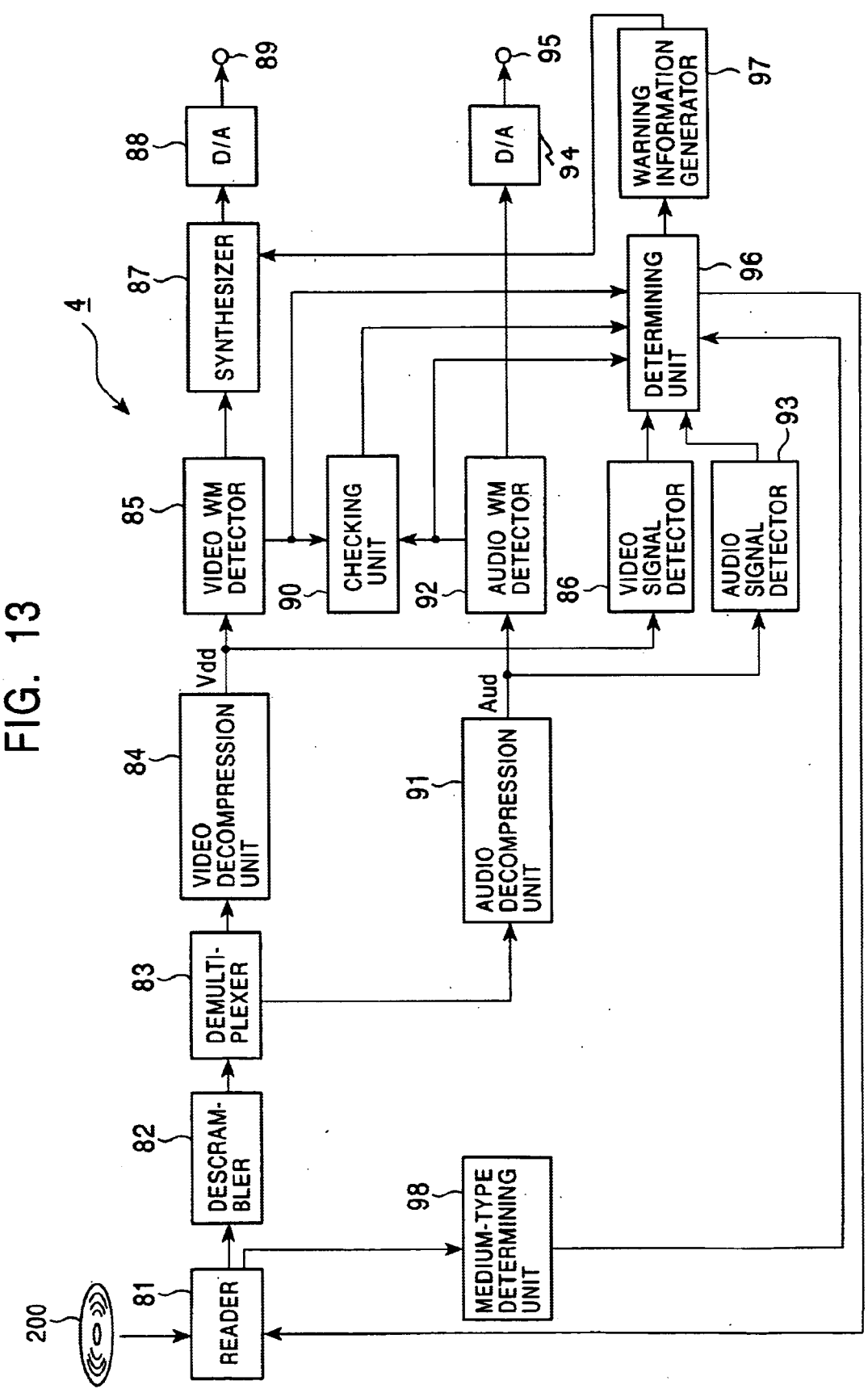
FIG. 13 is a block diagram illustrating an information signal playback apparatus as an information signal processing apparatus according to an embodiment of the present invention.

FIG. 13 is a block diagram illustrating an information signal playback apparatus (hereinafter simply referred to as the "playback apparatus") incorporating the information signal processing apparatus of the present invention for playing back and outputting the video signal and the audio signal recorded on a recording medium by using the information signal output apparatus shown in FIG. 1 as an authoring apparatus.

On a recording medium 200 loaded in a playback apparatus 4 constructed in accordance with an embodiment of the present invention, the video signal and the audio signal are recorded by the output apparatus 1, as discussed above. The recording medium 200 is, in this embodiment, a disc, such as a read-only DVD (DVD-ROM). That is, in this specification, the concept of the transmission of information signals encompasses not only the transmission of information signals by cable or radio, but also the recording of information signals on recording media and supplying them.

The playback apparatus 4 of this embodiment is formed of, as illustrated in FIG. 13, a reader 81, a descrambler 82, a demultiplexer 83, a video decompression unit 84, a video WM detector 85, a video signal detector 86, a video synthesizer 87, a D/A converter 88, an output terminal 89 for analog video signals, a checking unit 90, an audio decompression unit 91, an audio WM detector 92, an audio signal detector 93, a D/A converter 94, an output terminal 95 for analog audio signals, a determining unit 96, a warning information generator 97, and a medium-type determining unit 98.

A signal is read from the disc 200 by the reader 81 and is then supplied to the descrambler 82. In the descrambler 82, the signal is descrambled (decrypted) and is supplied to the demultiplexer 83.

The demultiplexer 83 demultiplexes the supplied signal into the video signal and the audio signal, and supplies the demultiplexed video signal to the video decompression unit 84 and supplies the demultiplexed audio signal to the audio decompression unit 91.

The video decompression unit 84 decompresses the supplied video signal according to a predetermined method so as to reconstruct the original baseband video signal, and supplies it to the video WM detector 85 and the video signal detector 86. Similarly, the audio decompression unit 91 decompresses the supplied audio signal according to a predetermined method so as to reconstruct the original baseband audio signal, and supplies it to the audio WM detector 92 and the audio signal detector 93.

The video WM detector 85 is configured similarly to the video WM detector 53 of the recording apparatus 3 discussed with reference to FIGS. 7 and 8. The video WM detector 85 supplies the video signal Vdd from the video decompression unit 84 to the synthesizer 87 as it is, and also detects the video additional information FV superimposed on the video signal Vdd as the digital watermark information and supplies it to the checking unit 90 and the determining unit 96.

The video signal Vdd supplied to the synthesizer 87 via the video WM detector 85 is further supplied to the D/A converter 88. In the D/A converter 88, the video signal Vdd is converted into an analog video signal, and is then output via the output terminal 89. The output video signal is supplied to a monitor receiver.

The video WM detector 85 performs inverse spread spectrum processing in a manner similar to the video WM detector 53 of the above-described recording apparatus 3 so as to detect the video additional information FV superimposed on the video signal Vdd as the digital watermark information, and supplies it to the checking unit 90 and the determining unit 96.

The video WM detector 85 also detects the detection reliability of the video additional information FV in a manner similar to the video WM detector 53, and supplies the corresponding information to the determining unit 96.

As in the video signal detector 54 of the recording apparatus 3, the video signal detector 86, which receives the video signal Vdd from the video decompression unit 84, monitors the level of the supplied video signal Vdd so as to detect the presence or the absence of the video signal Vdd, and supplies the detection result to the determining unit 96.

The audio WM detector 92 is configured similarly to the audio WM detector 59 of the aforementioned recording apparatus 3 shown in FIGS. 7 and 9. The audio WM detector 92 supplies the audio signal Aud from the audio decompression unit 91 to the D/A converter 94, and also detects the additional information FA superimposed on the audio signal Aud as the digital watermark information by performing the MDCT operation, and supplies the additional information FA to the checking unit 90 and the determining unit 96.

The audio signal Aud supplied to the D/A converter 94 via the audio WM detector 92 is converted into an analog audio signal and is output via the audio-signal output terminal 95. The audio signal is then supplied to, for example, a speaker provided for the monitor receiver.

As in the case of the video WM detector 85, the audio WM detector 92 determines the detection reliability of the additional information FA superimposed on the audio signal Aud and supplies the detection result to the determining unit 96.

The audio signal detector 93, which receives the digital audio signal Aud from the audio decompression unit 91, monitors the level of the supplied audio signal so as to detect the presence or the absence of the audio signal Aud, and reports the detection result to the determining unit 96.

Information, for example, indicating the type of recording medium, is recorded on the disc 200 and is read by the reader 81 and is supplied to the medium-type determining unit 98. The medium-type determining unit 98 determines the medium type of the disc 200 from the supplied information, and supplies the corresponding information to the determining unit 96.

Upon receiving the video additional information FV (see FIG. 2) detected in the video WM detector 85 and the audio additional information FA (see FIG. 4) detected in the audio WM detector 92, the checking unit 90 checks the relating information RS of the additional information FV with that of the additional information FA. The checking unit 90 then supplies to the determining unit 96 the checking result indicating whether both items of relating information RS are the same and whether both items of additional information FV and FA can be related to each other.

As a result, the determining unit 96 comprehensively determines whether the video signal and the audio signal recorded on the disc 200 can be played back, based on the checking result from the checking unit 90, the video additional information FV from the video WM detector 85, the audio additional information FA from the audio WM detector 92, the signal indicating the presence or the absence of the video signal from the video signal detector 86, the signal indicating the presence or the absence of the audio signal from the audio signal detector 93, and the medium-type information from the medium-type determining unit 98.

In this playback apparatus 4, as in the recording apparatus 3, basically, the determining unit 96 makes a determination according to the logical table shown in FIG. 12 whether the video signal and the audio signal recorded on the disc 200 can be played back or whether they should not be played back, i.e., whether the signals have been recorded legally or illegally.

More specifically, if the copying control information of the video additional information FV (indicated by video digital watermark in FIG. 12) from the video WM detector 85 and the copying control information of the audio additional information FA (indicated by audio digital watermark in FIG. 12) from the audio WM detector 92 correspond to one of the cases 1, 7, 8, 14, and 20, the determining unit 96 determines that the video signal and the audio signal recorded on the disc 200 have been legally recorded. In this case, the determining unit 96 controls the reader 81 to read and play back the video signal and the audio signal from the disc 200. As stated above, case 8 is a specific case, and is determined to be a correct state.

If the copying control information of the video additional information FV and the copying control information of the audio additional information FA correspond to one of the cases 2, 3, 4, 6, 9, 11, 12, and 13, such a state is determined to be abnormal. In this case, the determining unit 96 controls the reader 81 not to read or play back the video signal and the audio signal recorded on the disc 200.

In this case, the determining unit 96 also controls the warning information generator 97 to generate information (message) indicating that one or both of the video signal and the audio signal may have been illegally copied and are thus prohibited from being played back, and supplies the information to the synthesizer 87. Accordingly, the corresponding message is displayed on the display screen of the monitor receiver so that it can be reported to the user.

Then the user of the disc 200 can complain to the seller of the disc 200, thereby making it possible to prevent the content obtained by illegally copying the video signal and the audio signal from being distributed.

On the other hand, the prohibiting of the playback operation as described above may be too harsh to honest users.

Accordingly, instead of prohibiting the playback of the video signal and the audio signal, a message indicating that the video signal and the audio signal may have been illegally copied may be added to the video signal to be played back, and the synthesized message may then be displayed.

Alternatively, not only the determination result of the logical table, but also the determination result of the medium-type determining unit 98 may be used, and only when it is determined that the possibility that illegal copying has been conducted is higher, the playback operation may be prohibited. For example, if the disc 200 is found to be a DVD-RAM (rewritable DVD) from the medium type, and if one or both of the copying control information superimposed on the video signal and that on the audio signal read from the disc 200 indicate that copying is allowed for only one generation, the playback operation may be prohibited.

If the disc 200 is found to be a DVD-RAM from the medium type, and if one or both of the copying control information recorded on the video signal and that on the audio signal designate that copying is not allowed, the playback operation may be prohibited.

In the first case, normally, when a video signal and an audio signal which are allowed to be copied for only one generation are recorded (copied) on a DVD-RAM, the copying control information of the video signal and the audio signal should be overwritten by that indicating that copying is not allowed any more (No More Copies) when they are copied. Thus, it is not possible that a video signal and an audio signal which are allowed to be copied for only one generation are recorded on a DVD-RAM. Accordingly, in the first case, the possibility that the video signal and the audio signal have been illegally copied (copying may have been performed, for example, from a DVD-ROM to a DVD-RAM which is not provided with a copy protection function without overwriting copying control information) is high.

In the second case, it is not possible that the video signal and the audio signal which are not allowed to be copied are recorded (copied) on a DVD-RAM. Thus, the possibility that the signals have been illegally copied (for example, dead copy) is high.

In this manner, the medium type also counts for making the determination, and the playback operation is prohibited only when there is a high possibility that illegal copying has been conducted. It is thus possible to prevent the illegally copied content from being distributed without being harsh to the users of the video signals and the audio signals.

The video signal and the audio signal played back from the playback apparatus 4 of this embodiment may be supplied to the recording apparatus 3 and copied on a recording medium, such as a disc. In this case, as well as in the previous case, copying control (copying-restricted control) can be appropriately performed based on the video additional information CV detected from the video signal, the audio additional information FA detected from the audio signal, the presence or the absence of the video signal and the audio signal, etc.

Additionally, for example, a digital interface may be provided for the playback apparatus 4, and via this interface, the determination result of the medium-type determining unit 98 may be supplied to the determining unit 65 of the recording apparatus 3 via the digital interface 71. Thus, in the recording apparatus 3, as well as in the playback apparatus 4, copying control can be performed by taking into consideration the type of recording medium of the generation source of the video signal and the audio signal loaded in the playback apparatus 4.

More specifically, if the disc 200 is a DVD-RAM, and if one or both of the copying control information superimposed on the video signal read from the disc 200 and that on the audio signal read from the disc 200 indicate that copying is allowed for only one generation, copying is prohibited in the recording apparatus 3.

Likewise, if the disc 200 is a DVD-RAM, and if one or both of the copying control information superimposed on the video signal read from the disc 200 and that on the audio signal read from the disc 200 represent that copying is not allowed, copying is prohibited in the recording apparatus 3.

If the copying control information of the video additional information FV detected from the video WM detector 85 and that of the audio additional information FA detected from the audio WM detector 92 correspond to one of the cases 5, 10, 15, 16, 17, 18, and 19, as shown in FIG. 12. i.e., if one of the copying control information is not detected, it is determined that the playback operation is performed in this embodiment.

Even in this case, however, the medium type may be considered, and if there is a high possibility that the video signal and the audio signal have been illegally copied, as discussed above, the playback operation may be prohibited. It is thus possible to prevent the illegally copied content from being widely distributed.

As in the above-described recording apparatus 3, in the playback apparatus 4, it is possible to accurately determine whether the additional information has been detected correctly or erroneously, by considering the presence or the absence of the video signal and the audio signal and the detection reliability of the additional information. Based on the correctly detected additional information, playback control can be performed.

If the relating information of the additional information FV superimposed on the video signal is not related to that of the additional information FA on the audio signal, the possibility that illegal copying has been conducted is high. Accordingly, the playback operation may be unambiguously prohibited.

In this manner, highly reliable playback control can be performed by utilizing various items of information, such as the additional information superimposed on the video signal, its detection reliability, the additional information superimposed on the audio signal, its detection reliability, the presence or the absence of the video signal and the audio signal, the relating information of the additional information, and the medium type.

The video WM detector 85, the video signal detector 86, the checking unit 90, the audio WM detector 92, the audio signal detector 93, the determining unit 96, and the warning information generator 97 provided for the playback apparatus 4 of this embodiment may be provided for the set-top box 2 shown in FIG. 6. This enables the set-top box 2 to perform output control of the video signal and the audio signal, as in the playback apparatus 4.

In this manner, by utilizing various items of information, such as the additional information superimposed on the video signal, its detection reliability, the additional information superimposed on the audio signal, its detection reliability, the presence or the absence of the video signal and the audio signal, the relating information of the additional information, and the medium type, copying, playback, and output control can be conducted with a higher reliability.

By the provision of a specific case, as indicated by case 8 in FIG. 12, it is possible to implement a copying control system which eliminates the need for incrementing (overwriting) the copying control information superimposed on the video signal. Conventionally, the copying control information superimposed on the video signal as digital watermark information has to be incremented (overwritten) often. However, by obviating the need for overwriting the copying control information superimposed on the video signal, the configuration of the recording apparatus 3 can be simplified.

There are currently 18 or more formats of video signals in digital broadcasts, and it is difficult for a receiving side to superimpose digital watermark information, such as copying control information, while coping with all the video signal formats in terms of the circuit size and cost.

In contrast, there are only three popular formats of audio signals, such as AC3, AAC, and MPEG. It is thus comparatively easy for a receiving side to superimpose additional information, such as copying control information, as digital watermark information on the audio signal while coping with all the formats. It is also safe and less burdensome to superimpose the additional information on a bit stream.

Thus, as discussed above, by using at least both additional information superimposed on the video signal and that on the audio signal, highly reliable copyright protection can be achieved.

The additional information as the digital watermark information is detected from the baseband video signal, thereby enhancing the simplicity of the circuit and avoiding the above-described danger in the format conversion (system conversion).

Even in the recording apparatus or the recording/playback apparatus for video signals and audio signals, such as DVDs and video cassette recorders (VCRs), copyright protection is required for audio signals. Thus, advantages, such as the simplicity of the circuit configuration and a cost reduction, achieved by eliminating the need for incrementing the copying control information superimposed on the video signal, can be wholly enjoyed in the recording apparatus and the recording/playback apparatus.

By utilizing the additional information superimposed on the video signal and that on the audio signal, robustness to attacks, such as causing malfunctions in detecting the digital watermark information, can be statistically-doubled, thereby implementing highly reliable copyright protection. For example, even if digital watermark information superimposed on the video signal cannot be detected because of zooming or superimposition of the video signal, copyright protection can still be conducted by using the digital watermark information superimposed on the audio signal.

[Other examples of additional information]

In the foregoing embodiment, as shown in FIGS. 2 and 4, the video additional information FV and the audio additional information FA each have a total of eight bits consisting of the copying control information (two bits), the relating information (four bits), and others (two bits). However, the additional information is not restricted to this format.

For example, concerning the movie content, even though a video signal and an audio signal are associated with each other, only the audio signal may be desirably recorded on, for example, an MD. Accordingly, additional information for copyright protection may be added to only the audio signal, and in the MD recording/playback apparatus (MD apparatus), copyright protection for the audio signal may be performed based on the additional information for the audio signal.

To implement this modification, additional information is added to a video signal and an audio signal in the following manner. The additional information used for copyright protection for both the video signal and the audio signal which may be used in a recording or a recording/playback apparatus, such as a DVD or a VCR, can be distinguished from the additional information used for copyright protection for each of the video signal and the audio signal, separately.

Figure 14:
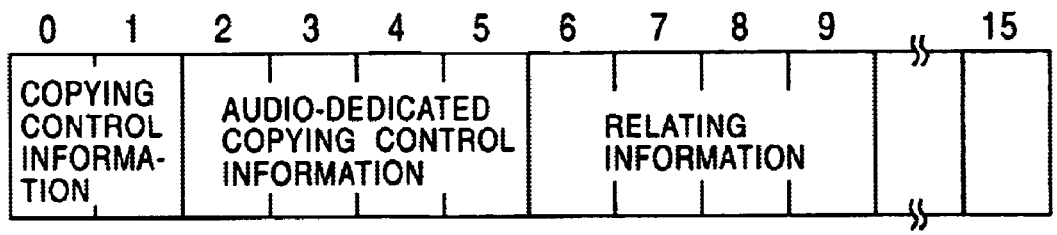
FIG. 14 illustrates another example of the additional information to be superimposed on information signals.
Figure 15A:
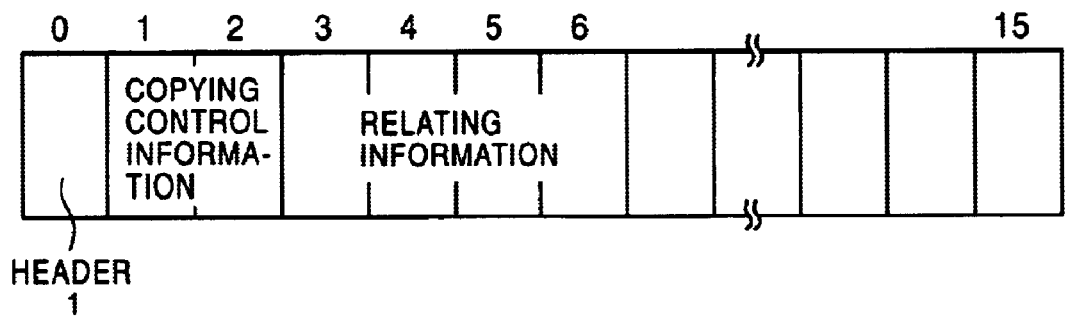
FIGS. 15A and 15B illustrate other examples of the additional information to be superimposed on information signals.
Figure 15B:
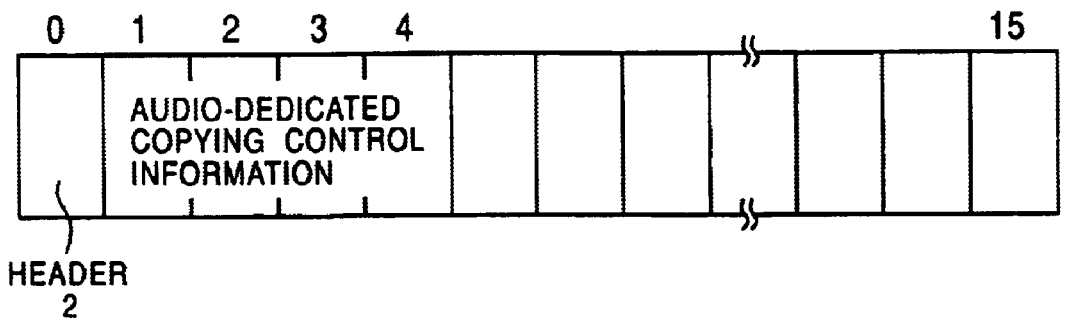

FIGS. 14, 15A, and 15B illustrate other examples of the additional information to be added to information signals, such as a video signal and an audio signal. In the example shown in FIG. 14, the additional information has 16 bits, and contains two slots for additional information used for copyright protection of both the video signal and the audio signal and for additional information used for copyright protection of only one of the signals.

More specifically. FIG. 14 illustrates an example of the audio additional information. As illustrated in FIG. 14, the additional information for copyright protection of both the video signal and the audio signal has two bits, i.e., bit 0 and bit 1, and the information for copyright protection only of the audio signal has four bits, i.e., from bit 2 to bit 5. In this manner, the above-mentioned two types of additional information have been positioned in advance, namely, slots have been assigned to the additional information.

Accordingly, when copyright protection of both the video signal and the audio signal is performed in a recording medium, such as a DVD, the two-bit additional information in bit 0 and bit 1 is checked. When copyright protection of only the audio signal is performed in an MD apparatus, the four-bit additional information from bit 2 to bit 5 is checked. It is thus clear which type of information is to be used according to the target of copyright protection.

FIGS. 15A and 15B illustrate examples of audio additional information in which the additional information for copyright protection of both video signal and audio signal is distinguished from that only of the audio signal by the use of a header.

That is, header 1 is added, as shown in FIG. 15A, to the additional information for copyright protection of both the video signal and the audio signal, while header 2 is added, as shown in FIG. 15B, to the information for copyright protection of only the audio signal. With this arrangement, when copyright protection of both the video signal and the audio signal is conducted in a recording apparatus, such as a DVD, the additional information with header 1 can be extracted. When copyright protection only of the audio signal is performed in an MD apparatus, the additional information with header 2 can be extracted. It is thus clear which type of information is to be used according to the target of copyright protection.

In FIGS. 14, 15A, and 15B, the audio additional information has been discussed by way of example. The same applies to the video additional information. In this embodiment, the length (bit length) of the additional information is predetermined, and the predetermined length of the additional information is repeatedly superimposed on the video signal and the audio signal as digital watermark information.

In the foregoing embodiment, a determination is made as to whether the video signal and the audio signal can be copied, according to various types of information, such as the additional information superimposed on the video signal as digital watermark information, its detection reliability, the additional information superimposed on the audio signal as digital watermark information, its detection reliability, the presence or the absence of the video signal and the audio signal, the relating information of the additional information, and the medium type. However, the information is not limited to the above items.

For example, only the additional information superimposed on the video signal and that on the audio information may be used, or the relating information may also be used in addition to the above-mentioned items of information. Alternatively, the additional information superimposed on the video signal, its detection reliability, the additional information superimposed on the audio signal, and its detection reliability may be used, or the relating information may also be added in addition to the above-mentioned items of information.

Alternatively, the additional information superimposed on the video signal, the additional information superimposed on the audio signal, and the presence or the absence of the video signal and the audio signal may be employed. Or, the additional information superimposed on the video signal, its detection reliability, the additional information superimposed on the audio signal, its detection reliability, and the presence or the absence of the video signal and the audio signal may be employed. That is, copyright protection may be performed by using a required number of items of information.

In the recording apparatus 3 described with reference to FIG. 7, the presence or the absence of the video signal and the audio signal is determined by detecting the signal levels. This is not exclusive, and for example, a switch may be disposed which is turned on when connection cables are connected to the analog-video input terminal 51 and to the analog-audio input terminal 57 and which is turned off when the connection cables are not connected thereto.

By the provision of the above-mentioned switch, the presence or the absence of the video signal and the audio signal can be mechanically detected. The state of the switch is reported to the determining unit 65. Accordingly, when, for example, a copying operation is attempted even though only the connection cable for the video signal is connected to the recording apparatus 3 and the connection cable for the audio signal is not connected thereto, the determining unit 65 can determine that the signals are to be illegally copied, and prohibits the copying operation.

Moreover, a switch similar to that discussed above may be provided for the analog-video output terminal 89 and the analog-audio output terminal 95 of the playback apparatus 4 described with reference to FIG. 13, and the state of the switch may be reported to the determining unit 96. With this arrangement, when, for example, a playback operation is attempted even though a connection cable for the video signal is connected to the playback apparatus 4 and a connection cable for the audio signal is not connected thereto, the determining unit 96 can determine that the signals are to be illegally copied, and prohibits the copying operation. The same applies to the set-top box 2 shown in FIG. 6.

In the above-described modification, if the connection cable for the audio signal is connected in case 15 shown in FIG. 12, it may be determined that copying is prohibited.

As stated above, the information signal output apparatus shown in FIG. 1 may be used as a broadcasting apparatus in a broadcasting station, or a computer provided with a communication function, such as a server, or an authoring tool for creating recording media used by content providers.

As discussed above, the playback apparatus 4 shown in FIG. 13 may be used for a receiving apparatus, such as a set-top box, and various types of output apparatuses for outputting video signals and audio signals, such as personal computers. A playback function may be provided for the recording apparatus 3 shown in FIG. 7, in which case, a resulting apparatus may be used as a recording/playback apparatus. Alternatively, the recording apparatus 3 shown in FIG. 7 may be combined with the playback apparatus 4 shown in FIG. 13, thereby forming a recording/playback apparatus.

In the foregoing embodiment, digital watermark information to be superimposed on the video signal is generated by using the spread spectrum operation, while digital watermark information to be superimposed on the audio signal is generated by using the MDCT and IMDCT operations. However, the digital watermark techniques are not restricted to the above methods. Other types of digital watermark techniques may be used.

The video additional information and the audio additional information are superimposed on the video signal and the audio signal, respectively, as digital watermark information. However, additional information other than digital watermark information may be used to perform copyright protection. For example, CGMS information may be used for the video signal, and SCMS information may be used for the audio signal.

In the aforementioned embodiment, copying control, playback control, and output control are performed as copyright protection. However, the copyright protection is not limited to the above types of control operations. For example, every time the video signal or the audio signal is copied, the apparatus number which has conducted the illegal copying operation may be added to the video signal or the audio signal, and may suitably be displayed, thereby making it possible to trace the illegal user.

The ID code of the copyright holder may be added to the video signal and the audio signal as the additional information, and if there is a discrepancy in the additional information between the video signal and the audio signal, the corresponding information (message) may be displayed and reported to the user.

In the foregoing embodiment, the video signal and the audio signal are used as targets of copyright protection. However, the present invention may be used when simultaneously transmitting various other types of information signals, such as a combination of computer data, for example, text data or program data, and a video signal, or a combination of computer data and an audio signal.

As is seen from the foregoing description, according to the present invention, copyright protection with a higher reliability can be performed on information signals to be transmitted. Additionally, by obviating the necessity for overwriting digital watermark information for a video signal, the burden and the cost for a recording apparatus can be reduced, and the circuit configuration can be simplified.

What is claimed is:

1. A copyright protection method comprising the steps of:
adding on a transmitting side additional information for copyright protection to a first information signal and a second information signal, said first information signal and said second information signal being mutually associated and independently usable, and outputting the first information signal and the second information signal with the additional information;
controlling on a receiving side a copyright protection operation on at least one of the first information signal and the second information signal based on the additional information added to the first information signal and the additional information added to the second information signal;

superimposing on the transmitting side the additional information on each of the first information signal and the second information signal as digital watermark information; and overwriting on the receiving side only the additional information superimposed on the second information signal when the additional information added to the first information signal and the additional information added to the second information signal are to be updated.

2. The copyright protection method according to claim 1, further comprising the steps of:

inserting on the transmitting side, relating information to the additional information added to the first information signal and to the additional information added to the second information signal, said relating information for relating the additional information added to the first information signal to the additional information added to the second information; and determining on the receiving side whether the first information signal is related to the second information signal by checking the relating information added to the first information signal against the relating information added to the second information signal.

3. An information signal processing system comprising:

an information signal output apparatus for outputting a first information signal and a second information signal, said first information signal and said second information signal being mutually associated and which are independently usable; and an information signal processing apparatus for processing the first information signal and the second information signal output from said information signal output apparatus, wherein said information signal output apparatus includes:

first additional-information generating means for generating first additional information for copyright protection to be added to the first information signal;

first additional-information addition means for adding the first additional information generated from said first additional-information generating means to the first information signal;

second additional-information generating means for generating second additional information for copyright protection to be added to the second information signal;

second additional-information addition means for adding the second additional information generated from said second additional-information generating means to the second information signal; and information signal output means for outputting the first information signal having the first additional information and the second information signal having the second additional information, and wherein said information signal processing apparatus includes:

first additional-information extraction means for extracting the first additional information from the first information signal output from said information signal output apparatus;

second additional-information extraction means for extracting the second additional information from the second information signal output from said information signal output apparatus; and control means for controlling a copyright protection operation on at least one of the first information signal and the second information signal based on the first additional information and the second additional information extracted by said first additional-information extraction means and said second additional-information extraction means, respectively, wherein in said information signal output apparatus, said first additional-information addition means superimposes the first additional information generated from said first additional-information generating means on the first information signal as digital watermark information, and said second additional-information addition means superimposes the second additional information generated from said second additional-information generating means on the second information signal as digital watermark information, and wherein in said information signal processing apparatus, said control means overwrites only the second additional information superimposed on the second information signal when the first additional information and the second additional information are to be updated.

4. The information signal processing system according to claim 3, wherein said information signal output apparatus further comprises relating-information generating means for generating relating information for relating the first additional information to be added to the first information signal to the second additional information to be added to the second information signal, and wherein, in said information signal output apparatus, said first additional-information addition means adds the relating information generated from said relating-information generating means to the first information signal, and said second additional-information addition means adds the relating information to the second information signal; and wherein, in said information signal processing apparatus, said first additional-information extraction means extracts the relating information added on the first information signal from the first information signal, said second additional-information extracting means extracts the relating information added on the second information signal from the second information signal, and said control means determines whether the first information signal and the second information signal are related to each other by checking the relating information extracted by said first additional-information extraction means against the relating information extracted by said second additional-information extraction means.

5. An information signal output apparatus for outputting a first information signal and a second information signal, said first information signal and said second information signal being mutually associated with each other and which are independently usable, said information signal output apparatus comprising:

first additional-information generating means for generating first additional information for copyright protection to be added to the first information signal;

first additional-information addition means for adding the first additional information generated from said first additional-information generating means to the first information signal;

second additional-information generating means for generating second additional information for copyright protection to be added to the second information signal;

second additional-information addition means for adding the second additional information generated from said second additional-information generating means to the second information signal; and information signal output means for outputting the first information signal having the first additional information and the second information signal having the second additional information, wherein said first additional-information addition means superimposes the first additional information generated from said first additional-information generating means on the first information signal as digital watermark information, and said second additional-information addition means superimposes the second additional information generated from said second additional-information generating means on the second information signal as digital watermark information, and wherein the first information signal comprises a video signal, and the second information signal comprises an audio signal, and, when the first information signal and the second information signal are allowed to be copied for one generation, said first additional-information generating means generates the first additional information indicating that copying is not allowed for further generations, said second additional-information generating means generates the second additional information indicating that copying is allowed for one generation, and said information signal output means outputs said first information signal having the first additional information and said second information signal having the second additional information.

6. The information signal output apparatus according to claim 5, further comprising relating-information generating means for generating relating information for relating the first additional information to be added to the first information signal to the second additional information to be added to the second information signal, wherein said first additional-information addition means adds the relating information generated from said relating-information generating means to the first information, and said second additional-information addition means adds the relating information generated from said relating-information generating means to the second information signal.

7. The information signal output apparatus according to claim 5, wherein said first additional-information generating means generates copying control information as the first additional information, and said second additional-information generating means generates copying control information as the second additional information.

8. The information signal output apparatus according to claim 5, wherein said first additional-information addition means and said second additional-information addition means add the first additional information and the second additional information, respectively, so that information for copyright protection for both the first information signal and the second information signal is distinguishable from information for copyright protection for each of the first information signal and the second information signal, separately.

9. The information signal output apparatus according to claim 5, wherein said information signal output means records the first information signal and the second information signal on a recording medium.

10. The information signal output apparatus according to claim 5, further comprising reading means for reading the first information signal having the first additional information superimposed and the second information signal having the second additional information superimposed from a recording medium.

11. An information signal processing apparatus for processing a first information signal and a second information signal, said first information signal and said second information signal being mutually associated and independently usable, having first additional information and second additional information, respectively, for copyright protection, said information signal processing apparatus comprising:

first additional-information extraction means for extracting the first additional information added to the first information signal;

second additional-information extraction means for extracting the second additional information added to the second information signal; and control means for controlling a copyright protection operation on at least one of the first information signal and the second information signal based on the first additional information and the second additional information extracted by said first additional-information extraction means and said second additional-information extraction means, respectively, wherein the first information signal and the second information signal contain copying control information as the first additional information and the second additional information, respectively, and said control means performs a copying control operation on at least the first information signal and the second information signal based on the copying control information of one of the first and second additional information which provides a greater restriction the copying operation more tightly than the copying control operation of the other additional information, and the first additional information and the second additional information are added to the first information signal and the second information signal, respectively, as digital watermark information, said first additional-information extraction means extracts the first additional information superimposed on the first information signal as the digital watermark information, and said second additional-information extraction means extracts the second additional information superimposed on the second information signal as the digital watermark information, said information signal processing apparatus further comprises additional-information overwriting means for overwriting only one of the first additional information and the second additional information.

12. The information signal processing apparatus according to claim 11, wherein the first additional information and the second additional information contain relating information for relating the first additional information to the second additional information, said first additional-information extraction means extracts the relating information superimposed on the first information signal from the first information signal, said second additional-information extraction means extracts the relating information superimposed on the second information signal from the second information signal, and said control means determines whether the first information and the second information are related to each other by checking the relating information extracted by said first additional-information extraction means against the relating information extracted by said second additional-information extraction means.

13. The information signal processing apparatus according to claim 11, further comprising:

first signal detection means for detecting presence of the first information signal; and second signal detection means for detecting presence of the second information signal, wherein said control means performs the copying control operation on at least one of the first information signal and the second information signal based on a detection output from said first signal detection means, a detection output from said second signal detection means, an extraction output from said first additional-information extraction means, and an extraction output from said second additional-information extraction means.

14. The information signal processing apparatus according to claim 11, wherein the first information signal comprises a video signal, and the second information signal comprises an audio signal, and said additional-information overwriting means overwrites only the second additional information superimposed on the second information signal.

15. The information signal processing apparatus according to claim 11, wherein the first additional information and the second additional information are superimposed on the first information signal and the second information signal, respectively, as digital watermark information, said first additional-information extraction means extracts the first additional information superimposed on the first information signal as the digital watermark information, said second additional-information extraction means extracts the second additional information superimposed on the second information signal as the digital watermark information, and said control means performs the copyright protection operation on at least one of the first information signal and the second information signal, based on the detected additional information, when only one of the first additional information and the second additional information is detected from one of said first additional-information extraction means and said second additional-information extraction means, respectively.

16. The information signal processing apparatus according to claim 15, further comprising:

first signal detection means for detecting the presence of a first information signal;

second signal detection means for detecting a presence of the second information signal; and signal determining means for determining whether the first additional information and the second additional information are not detected because of the absence of the first information signal and the second information signal, respectively, based on detection outputs from said first signal detection means and said second signal detection means.

17. The information signal processing apparatus according to claim 11, wherein the first additional information and the second additional information are superimposed on the first information signal and the second information signal, respectively, as digital watermark information, said first additional-information extraction means extracts the first additional information superimposed on the first information signal as the digital watermark information, said second additional-information extraction means extracts the second additional information superimposed on the second information signal as the digital watermark information, and said control means performs the copyright protection operation by determining that neither the first additional information nor the second additional information is detected from the first information signal and the second information signal when one of the first additional information and the second additional information is not detected from one of said first additional-information extraction means and said second additional-information extraction means, respectively, and when the other additional information is unstably detected in one of said first additional-information extraction means and said second additional-information extraction means.

18. The information signal processing apparatus according to claim 11, further comprising reading means for reading the first information signal having the first additional information and the second information signal having the second additional information from a recording medium, wherein said control means performs the copyright protection operation on the first information signal and the second information signal based on information indicating a type of recording medium on which the first information signal and the second information signal are recorded.

* * * * *